(12) United States Patent
Trautman

(10) Patent No.: US 7,912,742 B2
(45) Date of Patent: Mar. 22, 2011

(54) VISUALIZATION OF AIRLINE FLIGHT SCHEDULES

(75) Inventor: Philip L. Trautman, Kent, WA (US)

(73) Assignee: The Boeing Company, Chicago, IL (US)

( * ) Notice: Subject to any disclaimer, the term of this patent is extended or adjusted under 35 U.S.C. 154(b) by 744 days.

(21) Appl. No.: 11/385,915

(22) Filed: Mar. 20, 2006

(65) Prior Publication Data

US 2007/0219833 A1 Sep. 20, 2007

(51) Int. Cl.
  *G06Q 10/00* (2006.01)
  *G01C 21/34* (2006.01)
  *G06F 9/44* (2006.01)
  *G05D 1/08* (2006.01)

(52) U.S. Cl. .................. 705/5; 705/6; 705/7.11; 701/4; 701/29

(58) Field of Classification Search .................. 705/5–8; 701/4, 29
See application file for complete search history.

(56) References Cited

U.S. PATENT DOCUMENTS

| | | | | |
|---|---|---|---|---|
| 5,652,867 | A * | 7/1997 | Barlow et al. | 703/6 |
| 5,745,738 | A * | 4/1998 | Ricard | 703/13 |
| 6,314,361 | B1 * | 11/2001 | Yu et al. | 701/120 |
| 7,461,125 | B2 * | 12/2008 | Wang et al. | 709/204 |
| 2003/0191678 | A1 | 10/2003 | Shetty et al. | 705/8 |
| 2004/0199307 | A1 * | 10/2004 | Kipersztok et al. | 701/29 |
| 2005/0071206 | A1 * | 3/2005 | Berge | 705/6 |
| 2005/0165628 | A1 * | 7/2005 | Vaaben et al. | 705/5 |
| 2005/0209896 | A1 * | 9/2005 | Fauser et al. | 705/5 |
| 2005/0246208 | A1 * | 11/2005 | Langerman | 705/5 |
| 2006/0074725 | A1 * | 4/2006 | Huang et al. | 705/7 |
| 2006/0089760 | A1 * | 4/2006 | Love et al. | 701/4 |
| 2006/0112139 | A1 * | 5/2006 | Maple et al. | 707/104.1 |
| 2007/0265896 | A1 * | 11/2007 | Smith | 705/7 |

OTHER PUBLICATIONS

Alexander, Klein et al., "TAAM: Total Airspace & Airport Modeller", May 14, 1996, MIT AATT Model Project.*
Delano, Michael et al., "The Airline Schedule Recovery Problem", Oct. 1997, Transportation Science.*
Klein, Alexander, "A 4D Flight Profile Server and Probability-Based 4D Weather Objects: Towards a Common-Core TFM Toolset for the NAS", Geore Mason University.*
Jani, Milan, "Modeling the Large Scale Disruptions of an Airline Network", Apr. 2005, J. Transp. Engrg., V. 131, Issue 4.*
Thengvall, Benjamin et al., "Multiple Fleet Aircraft Schedule Rcovery Following Hub Closures", Nov. 1999, Elsevier Science LTD, p. 298-308.*
http://www.agifors.org/studygrp/opsctl/2004/proceedings.html.
http://www.jeppesen.com/industry-solutions/aviation/government/total-airspace-airport-modeler.jsp.
MTR 01W0000092 "Technical Report": *TAAM Best Practice Guidelines*. Mitre Center for Advanced Aviation System Development, The Mitre Corporation, © 2001.

* cited by examiner

*Primary Examiner* — Fadey S Jabr
(74) *Attorney, Agent, or Firm* — Tung & Associates

(57) ABSTRACT

A method for visualizing airline flight schedules graphically simulates the effect of a program implemented in airline flight operations to reduce the effect of disruptions in scheduled airline flights. One or more disruptions are introduced into a pre-selected airline flight schedule, using frequency distributions of disruptions and disruption severities, resulting in a disrupted flight schedule that reflects both initial and propagated delays. The disrupted flight schedule is used to visually simulate flight operations in 4-D, allowing comparisons of "as is" and "what if" scenarios.

22 Claims, 30 Drawing Sheets

Switch Airline: Boeing

| FLEET INFORMATION | AIRLINE PROCESS MODEL | CHALLENGE CHOOSER | SOLUTION CHOOSER | AIRLINE OPERATIONS | VALUE CALCULATOR |
|---|---|---|---|---|---|

| Operator | Model | Total Fleet | Avg. Trip Time | Daily Utilization Calendar | Daily Utilization In-Service | Mechanical Schedule Reliability >0 | Mechanical Schedule Reliability Adj. |
|---|---|---|---|---|---|---|---|
| AIR FRANCE | 747-300PC | 2 | 7.58 | 13.67 | 14.25 | 97.74 | 97.23 |
| AIR FRANCE | 777-200ER | 25 | 7.60 | 13.50 | 14.40 | 99.37 | 98.73 |
| AIR FRANCE | 747-400PC | 6 | 8.42 | 12.50 | 13.00 | 97.61 | 97.25 |
| AIR FRANCE | 737-300 | 3 | 1.36 | 11.00 | 12.00 | 99.14 | 98.90 |
| AIR FRANCE | 747-400 | 10 | 8.49 | 13.50 | 13.51 | 98.39 | 97.40 |
| AIR FRANCE | 747-200FM | 2 | 4.82 | 9.00 | 10.50 | 97.53 | 95.70 |
| AIR FRANCE | 747-200F | 8 | 5.40 | 9.00 | 10.00 | 97.83 | 95.00 |
| AIR FRANCE | 747-200BSPC | 2 | 7.62 | 8.50 | 10.00 | 98.23 | 97.40 |
| AIR FRANCE | 747-200BPC | 3 | 8.37 | 8.50 | 10.00 | 98.07 | 96.34 |
| AIR FRANCE | 747-200B | 2 | 8.52 | 8.50 | 10.00 | 98.67 | 96.34 |
| AIR FRANCE | 737-500 | 22 | 1.31 | 10.50 | 11.00 | 99.32 | 99.00 |

Fig. 4

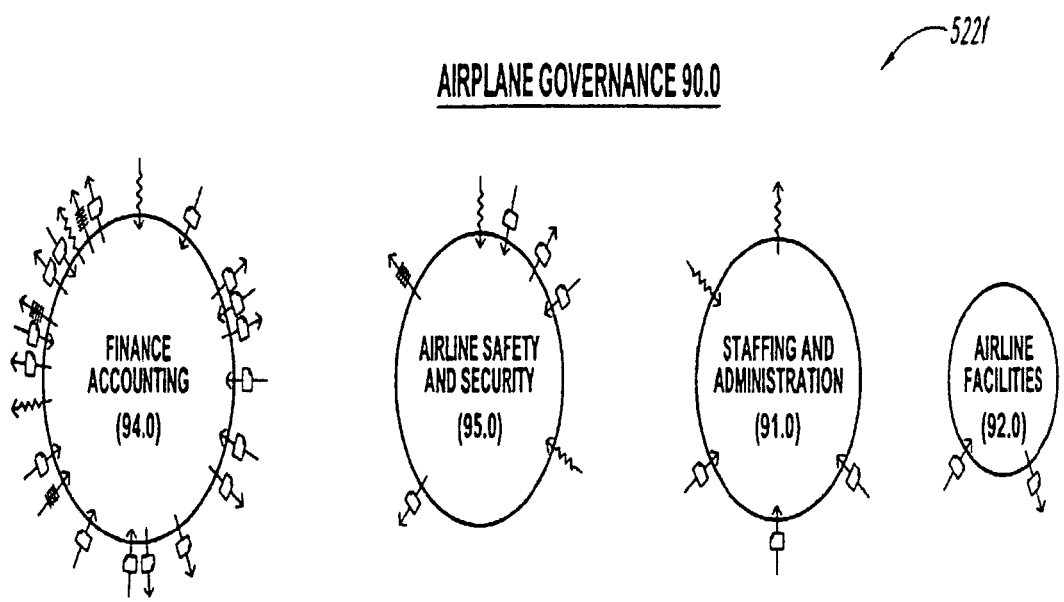
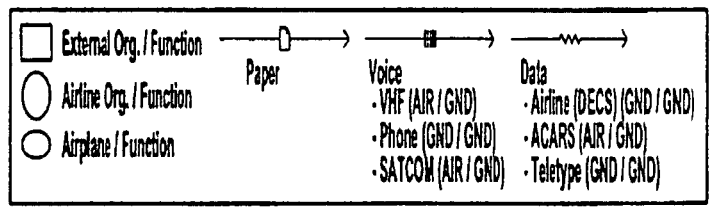
Fig. 5G

| | | | | | |
|---|---|---|---|---|---|
| FLEET INFORMATION | AIRLINE PROCESS MODEL | CHALLENGE CHOOSER | SOLUTION CHOOSER | AIRLINE OPERATIONS | VALUE CALCULATOR |

CASE SUMMARY —1302   —1304

| CASE | MODEL | DATE | TIME | PRODUCTS | |
|---|---|---|---|---|---|
| Delays and Cancellations | | | | | |
| As Is | | 5/30/2004 | 12:00:47 AM | None | |
| What If-146 | | 10/28/2004 | 10:20:21 AM | | Select |
| What If-145 | | 10/26/2004 | 3:07:16 PM | AHM, PMA, Reliability Program with Component... | Select |
| What If-144 | | 10/26/2004 | 1:48:37 PM | AHM, PMA | Select |
| What If-143 | | 10/26/2004 | 1:42:53 PM | AHM, PMA, ACM | Select |
| What If-142 | | 10/26/2004 | 1:42:53 PM | | Select |
| What If-141 | | 10/26/2004 | 1:42:53 PM | AHM, PMA | Select |
| What If-140 | | 10/26/2004 | 1:38:18 PM | AHM, PMA, Task Card Updates | Select |
| What If-139 | | 10/26/2004 | 1:14:52 PM | AHM, PMA, Maintenance Program Management | Select |
| What If-138 | | 10/26/2004 | 1:11:54 PM | AHM, PMA, Reusable Solutions (Knowledge Management) | Select |

*Fig. 13*

Maintenance Services Value Calculator

Tabs: FLEET INFORMATION | AIRLINE PROCESS MODEL | CHALLENGE CHOOSER | SOLUTION CHOOSER | AIRLINE OPERATIONS | VALUE CALCULATOR

Model Delay Costs — 1470a

|  | 717 | 737 | 757 | 767 | 747 | 777 | 767 |
|---|---|---|---|---|---|---|---|
| Air Turnback 'as if' 'what if' | | | | | | | |
| Cancellations | | | | | | | |
| Delay per Hour | | | | | | | |
| Diversions | | | | | | | |

Fleet Value ($M) — 1470b

| Product Service | Annual Value | Annual Cost | Net Value | Benefit Cost/Ratio |
|---|---|---|---|---|
| Air Turnback | | | | |
| Cancellations | | | | |
| Delay per Hour | | | | |
| Diversions | | | | |

Fleet Profitability

Customer Solution Cost — 1470c

| Year→ | 1 | 2 | 3 | 4 | 5 | 6 | 7 | 8 | 9 | 10 |
|---|---|---|---|---|---|---|---|---|---|---|
| Total | | | | | | | | | | |

Customer Savings

| Total | | | | | | | | | | |
|---|---|---|---|---|---|---|---|---|---|---|
| Cash Flow | | | | | | | | | | |
| Cumulative | | | | | | | | | | |

Risk Factors (%): Inflation | Service Cost | Projected Revenue | Cost of Capital

CALCULATE

NVP ($M): $XXXXX    Years: 5

Payback (Months): XX    6

- ASSUMPTIONS/GROUND RULES
- Charts: ANNUAL CASH FLOW
- CUMULATIVE CASH FLOW
- 1422 — EXECUTIVE SUMMARY
- 1420 — BUSINESS CASE
- 1418 — PROPOSAL

| | | 737-400 | | | 767-200 | | | 767-300 | | | 747-100 | | | 747-200 | | | 747-300 | | | 747-400 | | | 777-200 | | | 777-300 | | | 7E7-8 | | |
|---|---|---|---|---|---|---|---|---|---|---|---|---|---|---|---|---|---|---|---|---|---|---|---|---|---|---|---|---|---|---|
| | | TI | As Is | Wil | TI | As Is | Wil | TI | As Is | Wil | TI | As Is | Wil | TI | As Is | Wil | TI | As Is | Wil | TI | As Is | Wil | TI | As Is | Wil | TI | As Is | Wil | TI | As Is | Wil |
| Efficiency Productivity & Cost Reduction | Tech. Info. | 8 | | | 3 | | | 31 | | | 3 | | | 18 | | | 14 | | | 42 | | | 14 | | | 8 | | | | | |
| | Config. M/M | 8 | | | 3 | | | 31 | | | 3 | | | 18 | | | 14 | | | 42 | | | 14 | | | 8 | | | | | |
| | Crew | 8 | | | 3 | | | 31 | | | 3 | | | 18 | | | 14 | | | 42 | | | 14 | | | 8 | | | | | |
| | AOC | 8 | | | 3 | | | 31 | | | 3 | | | 18 | | | 14 | | | 42 | | | 14 | | | 8 | | | | | |
| | Outsourced | 8 | | | 3 | | | 31 | | | 3 | | | 18 | | | 14 | | | 42 | | | 14 | | | 8 | | | | | |
| Availability & Reliability | Maint. Comp. | 8 | | | 3 | | | 31 | | | 3 | | | 18 | | | 14 | | | 42 | | | 14 | | | 8 | | | | | |
| | Pro Health | 8 | | | 3 | | | 31 | | | 3 | | | 18 | | | 14 | | | 42 | | | 14 | | | 8 | | | | | |
| | Reliability | 8 | | | 3 | | | 31 | | | 3 | | | 18 | | | 14 | | | 42 | | | 14 | | | 8 | | | | | |
| Safety, Security, Reliability | Paperless Flt. Ops. | 8 | | | 3 | | | 31 | | | 3 | | | 18 | | | 14 | | | 42 | | | 14 | | | 8 | | | | | |
| | Maint. Eval. | 8 | | | 3 | | | 31 | | | 3 | | | 18 | | | 14 | | | 42 | | | 14 | | | 8 | | | | | |
| | Train Ops. | 8 | | | 3 | | | 31 | | | 3 | | | 18 | | | 14 | | | 42 | | | 14 | | | 8 | | | | | |
| | Enhanced Flt. Ops. | 8 | | | 3 | | | 31 | | | 3 | | | 18 | | | 14 | | | 42 | | | 14 | | | 8 | | | | | |
| Passenger Exp & Airplane Life Ext. | Interior Recessed | 8 | | | 3 | | | 31 | | | 3 | | | 18 | | | 14 | | | 42 | | | 14 | | | 8 | | | | | |
| | Cabin Reconfig. | 8 | | | 3 | | | 31 | | | 3 | | | 18 | | | 14 | | | 42 | | | 14 | | | 8 | | | | | |
| | IFE | 8 | | | 3 | | | 31 | | | 3 | | | 18 | | | 14 | | | 42 | | | 14 | | | 8 | | | | | |
| | PAX to Freighter | 8 | | | 3 | | | 31 | | | 3 | | | 18 | | | 14 | | | 42 | | | 14 | | | 8 | | | | | |

Tabs: FLEET INFORMATION | AIRLINE PROCESS MODEL | CHALLENGE CHOOSER | SOLUTION CHOOSER | AIRLINE OPERATIONS | VALUE CALCULATOR

VISUALIZATION OF AIRLINE FLIGHT SCHEDULES

FIELD OF THE INVENTION

This invention generally relates to modeling the operations of commercial airlines, and deals more particularly with a method for visualizing the effects of changes in airline flight schedules.

BACKGROUND OF THE INVENTION

An airline or other large commercial or non-commercial enterprise typically requires the coordinated efforts of many different functional groups. Generally, each of the different groups is responsible for managing a different part of the enterprise. A typical airline, for example, can include different functional groups for managing flight operations, aircraft maintenance, passenger services, and other aspects of the business necessary for day-to-day operations. The efficiency with which these different functional groups cooperate to run the airline can have a direct effect on the profitability and, ultimately, the success of the airline in a competitive marketplace.

Conventional methods for modeling the complex operations of airlines and other large enterprises typically include process flow charts and other types of schematic diagrams that attempt to illustrate the inter-workings of the different functional groups. Although these methods may illustrate some functional relationships at a relatively high level, they are of limited value in analyzing process interactions because they typically lack detailed information about the various attributes (e.g., cost, time, etc.) associated with each process. Further, these methods also tend to lack a detailed description of the routing and sequencing of information flows between the different functional groups. As a result, such methods offer little assistance in identifying problem areas and assessing the impact of changes to a particular process.

One problem facing companies that produce and market such products and services is how to justify the investment in the product or service to the airline operator. That is, how best to make the business case to the potential customer. A typical marketing approach is to "demo" the product or service using a fictitious business model. The downside of this approach, however, is that the fictitious model may or may not be a realistic simulation of the actual airline. As a result, the airline operator may have a hard time visualizing and understanding the benefits of the product or service, and may remain unconvinced of the value to their airline.

Proving the value of goods and services is particularly difficult where the business case depends on assessing the impact of a product or service on airline flight schedules. For example, in marketing products or services to airline customers that are intended to reduce the impact of disrupted airline flight schedules, is important to provide the customer with a demonstration showing the benefits of the product or service being marketed. In the past, this demonstration has been limited to generating simple data showing how the product or service can reduce the impact of disruptions on a single facet of airline operations such as congestion at a particular airport during a specific time interval, or the availability of gates for a particular aircraft. The value of such demonstration data is limited in its marketing impact since it does not give the customer a total view of the effect on all of the customer's flight operations and aircraft.

Complicating the problem of providing a complete overview of the impact of a product on disrupted flight schedules is the fact that a single initial disruption in an airline schedule can result in a delay which is propagated throughout the customer's flight schedule, resulting in numerous additional delays and related operations problems for multiple legs of the flight schedule. Adding to the difficulty of predicting the effects of flight disruptions is the problem of predicting the severity of propagated flight disruptions. Thus, without a method for providing the customer with a visualized demonstration of a proposed product showing overall impact on all aspects of flight operations, it is difficult to build an economic case to support use of the product.

Accordingly, there is a need for a method of visualizing the effects of a product intended to reduce the adverse impact of disruptions in flight schedules, which overcomes the deficiencies discussed above. The present invention is directed toward satisfying this need.

SUMMARY OF THE INVENTION

According to one aspect of the invention, a method is provided for visualizing commercial airline flight operations based on aircraft flight schedules. The method comprises the steps of: selecting an airline flight schedule representing scheduled aircraft flights; introducing at least one initial flight disruption into the flight schedule; generating "as is" airline operations information reflecting the disruption, and "what if" airline operations information reflecting corrective action taken in response to the disruption; visually simulating airline operations using the "as is" information; and, visually simulating airline operations using the "what if" information. Additional disruptions caused by the initial disruption are preferably introduced into the flight schedule in order to provide simulations that reflect propagated flight delays. Realistic portrayals of flight disruptions are achieved by introducing, for each flight leg, statistical data representing a frequency distribution of disruptions and a frequency distribution of flight disruption severity. The method further includes graphically displaying in side-by-side relationship, the "as is" and "what if" airline operations information. A matrix is generated showing the delay of each aircraft for each flight leg in the flight schedule. A calculation is also performed of the cost incurred in airline operations resulting from the initial and additional disruptions.

According to another aspect of the invention, a method is provided for visualizing commercial airline flight operations having disrupted aircraft flight schedules. The method comprises the steps of selecting an airline flight schedule having scheduled flights for a plurality of aircraft; introducing an initial flight disruption into the flight schedule; generating a first set of airline operations data representing the effect on airline flight operations of the initial flight disruption; proposing an operations solution to reduce the effect of the initial disruption on airline flight operations; generating a second set of airline operations data representing the effect on airline flight operations of the use of the proposed solution; and, displaying a graphical comparison of the first and second sets of data. Airline operations are visually simulated using the first and second sets of airline operations data to allow a visual comparison of the airline operations with and without use of the proposed solution. Propagated disruptions resulting from the initial disruption are determined which are reflected in the visual simulation of flight operations. Statistical data is generated for each flight leg representing a frequency distribution of disruption and a frequency distribution of flight disruption severity. A disrupted airline flight schedule is generated using the statistical data.

According to still another aspect of the invention, a method is provided for graphically simulating the effect of a program implemented in airline flight operations to reduce the effect of disruptions in scheduled airline flights. The method comprises the steps of: selecting an airline flight schedule representing scheduled aircraft flights; introducing at least one initial flight disruption into the flight schedule; visually simulating airline flight operations based on the disrupted flight schedule; selecting a program for reducing the effect of the disruption on flight operations; and, visually simulating airline operations reflecting implementation of the selected program. The method includes determining propagated disruptions in the flight schedule caused by the initial disruption. The cost of airline flight operations is calculated based on the disrupted flight schedule using a before assessment of costs, and the cost of flight operations after implementation of the selected program. The duration of flight delays are also calculated both before and after implementation of the corrective program.

An important advantage of the invention is that the impact of a product solution for reducing flight disruptions can be visually demonstrated over an entire flight schedule. "As is' and "what if" scenarios are visually depicted in realistic 4-D, allowing a customer to see multiple downstream effects of an initial disruption on a flight schedule, and how those effects are reduced or eliminated through the use of a proposed product solution. Another feature of the invention is that the customer can also view graphical data representing airline operations for both "as is "and what if" cases, allowing a side-by-side comparison of the information.

Various additional objects, features and advantages of the present invention can be more fully appreciated with reference to the detailed description and accompanying drawings that follow.

BRIEF DESCRIPTION OF THE DRAWINGS

FIG. 4 is a schematic diagram of a display page presenting aircraft fleet information.

FIGS. 5B-I illustrate enlarged portions of the airline process model of FIG. 5A.

FIG. 13 is a schematic diagram of a display page that provides information about existing "as is" and "what if" event cases.

FIG. 14 is a schematic diagram of a display page for comparing costs associated with an "as is" model to costs associated with a corresponding "what if" model.

FIG. 16 is a schematic diagram of a display page that enables a user to "scale-up" benefits associated with selected products and services.

FIG. 20 is a view similar to FIG. 19, but showing disruption statistics in a matrix format.

DETAILED DESCRIPTION OF THE PREFERRED EMBODIMENTS

The following disclosure describes computer-implemented methods and systems for modeling the operations of airlines and other commercial and non-commercial industries, and for simulating and valuing the effects of different products and services on those operations, such as solutions for reducing service disruptions. Specific details of several embodiments of the invention are described below to provide a thorough understanding of the embodiments. Other details describing well-known aspects of airlines and airline operational systems are not set forth below, however, to avoid unnecessarily obscuring the description of the various embodiments. Furthermore, although various embodiments of the invention are described below, those of ordinary skill in the art will understand that the invention can have other embodiments in addition to those described below. Such embodiments may lack one or more of the elements described below or, conversely, they may include other elements in addition to those described below.

Certain embodiments are described below in the context of computer-executable instructions performed by a general-purpose computer, such as a personal computer. The computer-executable instructions can be stored on various types of computer-readable media including, for example, hard disks, floppy disks, or a CD-ROMs. In other embodiments, these instructions can be stored on a server computer system and accessed via a computer network such as an intranet or the Internet. Because the basic structures and functions often associated with computer systems and related routines are well known, they have not been shown or described in detail here to avoid unnecessarily obscuring the described embodiments.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
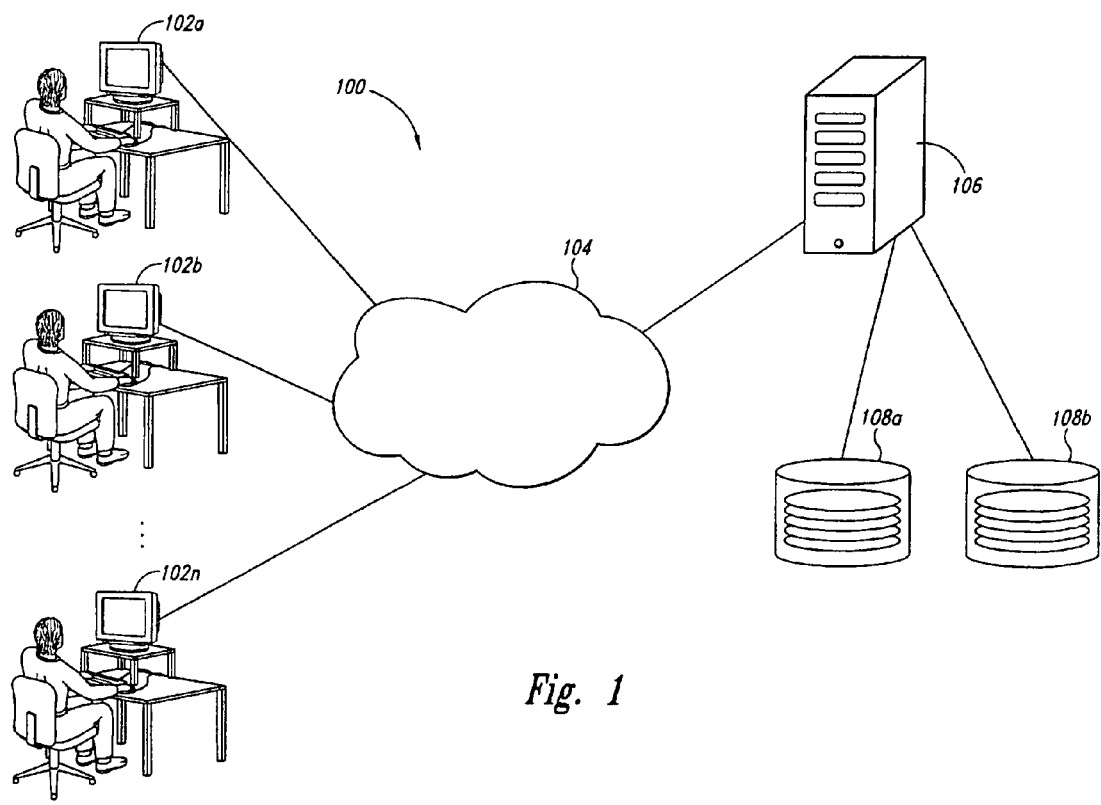
FIG. 1 is a schematic diagram of a system suitable for implementing various embodiments of the present invention.

FIG. 1 is a schematic diagram of a system 100 suitable for implementing various embodiments of the present invention. The system 100 can include a plurality of user computers 102a-n operably connected to a server computer 106 via a communications link 104. Each of the user computers 102 can include a central processing unit, memory devices, input devices (e.g., a keyboard and a pointing device), output devices (e.g., a display screen or other device), and data storage devices (e.g., disk drives). The memory and storage devices can include computer-readable media that contain computer-executable instructions for implementing many of the processes, routines, and display pages of the present invention. As described in greater detail below, these processes, routines, and display pages can be used to model the various operational processes of an airline and graphically simulating the value that various products and services can have on those processes.

The user computers 102 can further include a browser module (not shown) that enables a user to access and exchange data with the server computer 106 and other sites via the communications link 104. The communications link 104 can be a computer network, such as a local area network (LAN), an intranet, or the Internet. The communications link 104 can be implemented using any one of a wide variety of conventional communications configurations including both wired and wireless types. Further, any of a wide variety of communications protocols can be used to transmit data via the communications link 104, including both public and proprietary protocols. The server computer 106 can be configured to retrieve data from a plurality of databases 108a-b and transmit the data in various forms to the user computers 102 via the communications link 104. Such data can include, for example, various information about different airlines, such as fleet size and make-up, routes, etc.

The system 100 is but one example of a suitable system for implementing various embodiments of the invention as described in greater detail below. Accordingly, the methods and systems disclosed herein are not limited to implementation on the system 100, but can be implemented on other types of general- and/or special-purpose computing systems or configurations. Examples of well-known computing systems, environments, and/or configurations that may be suitable for use with aspects of the invention include personal computers (PCs), server computers, portable and hand-held devices such as personal digital assistants (PDAs), laptop and tablet PCs, multiprocessor systems, microprocessor-based systems, set-top boxes, programmable consumer electronics, network PCs, mini-computers, mainframe computers, and/or distributed computing environments that include one or more of the above systems or devices.

Figure 2:
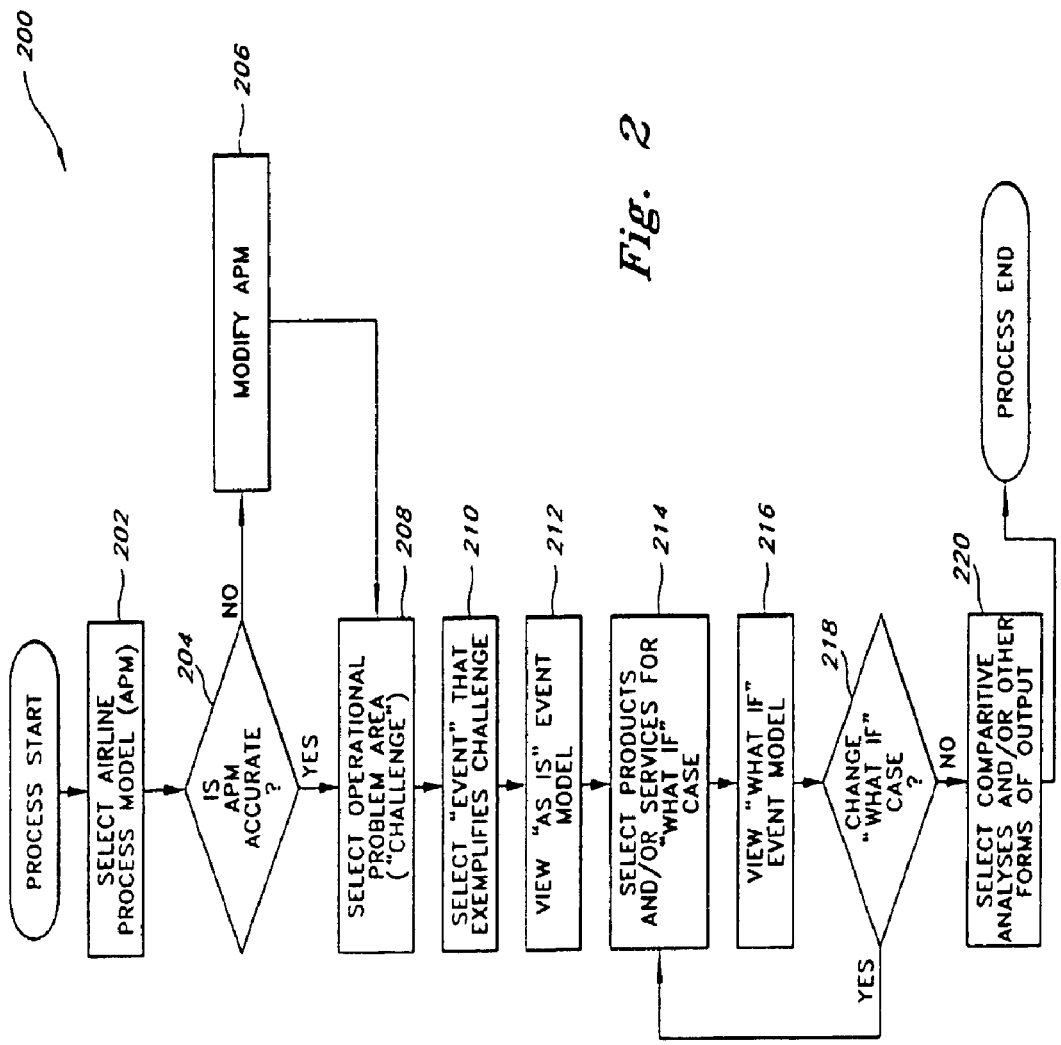
FIG. 2 is a flow diagram illustrating a process for simulating and/or valuing the effects of various products and/or services on an operational model.

FIG. 2 is a flow diagram illustrating a process 200 for simulating and/or valuing the effects of various products and/or services on an operational model. In one aspect of this embodiment, the process 200 can be performed by a sales agent of the products and services by operating one of the user computers 102 described above with reference to FIG. 1. The sales agent may be performing the process 200 for the benefit of a potential customer who is interested in seeing if there is a business case that would justify purchasing the products and services.

For purposes of illustration, the process 200 is described below in the context of an airline process model. Thus, in this particular embodiment, the process 200 can be used by a seller of airline-related products and services to demonstrate the benefits of the products and services to a potential customer, i.e., an airline operator. As described in greater detail below, such airline-related products and services can include, for example, various software products, database systems, document management systems, and hand-held computational devices that facilitate efficient airline operation. Although the process 200 is described below in an airline context, those of ordinary skill in the art will appreciate that other embodiments of the invention can be used in other commercial and noncommercial industries in various business sectors including both transportation and non-transportation related enterprises. Such industries can include, for example, marine, ground, and space transportation industries; military fleet operations; etc.

In the illustrated embodiment, the process 200 begins in block 202 with the selection of an "as is" airline process model (APM). As used herein, the term "as is" APM refers to an organized assembly of graphical and/or numerical data that describes functions, processes, information elements, and/or other parts of a global air transportation system (GATS). An example of an "as is" APM is described in greater detail below with reference to FIG. 5. In this embodiment, selecting the "as is" APM causes the APM to be displayed on a display screen or other suitable viewing device. The user (e.g., a sales agent) and/or others (e.g., an airline operator) can then view the "as is" APM to gain a better understanding of how the various functional groups in the airline currently interact during normal day-to-day operations. Further, in decision block 204, the user can determine if the "as is" APM accurately reflects the user's understanding of the current airline processes. If not, the user can modify the "as is" APM in block 206. As described in greater detail below, this modification can take the form of manipulating graphical data on the display screen and/or, alternatively, accessing a database to change various input data used to generate the "as is" APM.

After modifying the "as is" APM, or if the "as is" APM was accurate as initially displayed, the user can proceed to block 208 and select an area of the "as is" APM that the user feels needs improvement from, for example, a cost, schedule, or efficiency standpoint. In the present disclosure, such problem areas are referred to as "challenges," and can relate to, for example, certain aspects of aircraft maintenance, flight schedule reliability, pilot log book entries, etc.

After selecting a challenge, the user can select an "event" in block 210 that is otherwise associated with the selected challenge. In this embodiment, the term "event" refers to a particular operational circumstance to which the "as is" APM responds. For example, a fuel indicator malfunction is an event that is associated with the challenge of maintaining aircraft schedule reliability.

After the user has selected a challenge and one or more corresponding events, an "as is" event model can be displayed for viewing by the user. An example of an "as is" event model is described in greater detail below with reference to FIG. 10. In one aspect of this embodiment, the "as is" event model can be a portion of the overall "as is" APM that graphically illustrates the sequence of functions that must be executed by the portion of the "as is" APM to respond to the selected event. That is, the "as is" event model provides a graphical simulation of the event-specific path for responding to the selected event. Viewing the "as is" event model allows the user to gain a better understanding of the various functional groups that have to respond to a particular event in the "as is" APM. Further, by viewing this model, the user is able to identify where inefficient processes exist leading to increased time or cost impacts to operations. With this information in mind, the user can proceed to block 214 and select one or more products and/or services that, when implemented, enable the APM to respond to the particular event in a more efficient and less costly manner. After the various products and/or services have been selected, the user can proceed to block 216 and view a "what if" event model.

In a further aspect of this embodiment, the "what if" event model is similar to the "as is" event model in that it reproduces a particular portion of the overall APM. However, the "what if" event model differs from the "as is event model in that the "what if" event model graphically and/or numerically illustrates the greater efficiencies and more streamlined operations that result from implementing the selected products and/or services. Accordingly, one benefit of this embodiment is that it can quickly and easily provide a visual description of the benefits that implementing a particular product and/or service can have to the operations of an airline or other major enterprise.

If the user wishes to select other products and/or services and view the effects of implementing them, the user can do so in decision block 218 by returning to block 214 and proceeding as described above. Alternatively, the user can proceed to block 220 and select various forms of comparative analyses and/or other forms of output that illustrate the operational impact and value of implementing the "what if" model. Such comparative analyses can include, for example, a comparison of the relative costs between the "as is" event model and the "what if" event model. Other forms of comparative analyses can include a graphical display of the percent increase in on time schedule performance for the airline that results from implementing the selected products and/or services. Yet other forms of comparative analyses can be selected by the user including cash flow analyses, etc. In addition to the foregoing, the user can also request various forms of output in the form of data reports, executive summaries, business cases, business proposals, etc. These and other aspects of the present invention are described in greater detail below with reference to the corresponding display pages.

Figure 3:
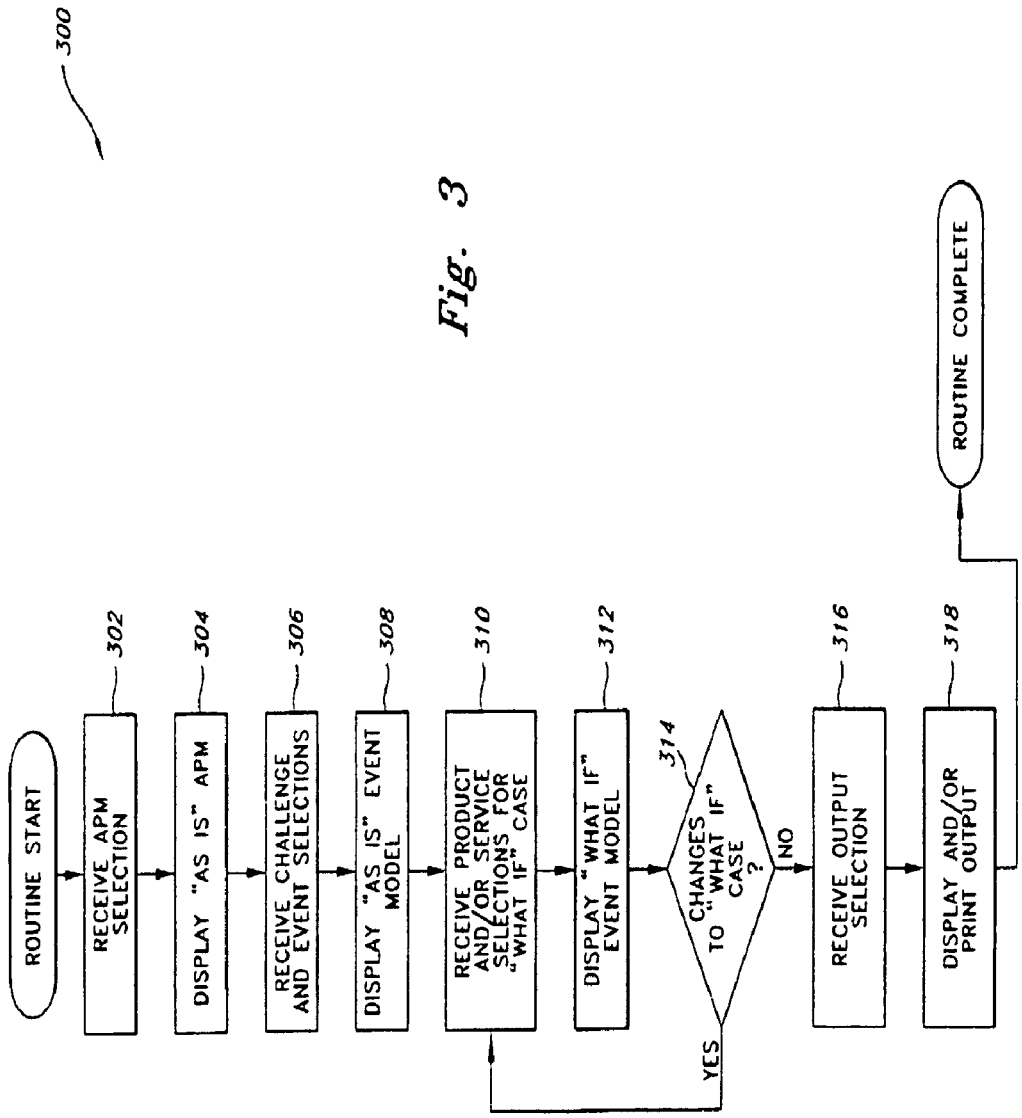
FIG. 3 is a flow diagram illustrating a routine for displaying a "what if" event model and providing various forms of output relating to the event model.

FIG. 3 is a flow diagram illustrating a routine 300 for displaying a "what if" event model and providing various forms of output relating to the event model in accordance with an embodiment of the invention. In one aspect of this embodiment, the routine 300 can be performed by one of the user computers 102 described above with reference to FIG. 1 in accordance with computer executable instructions stored on a corresponding computer-readable medium. In other embodiments, the routine 300 can be implemented by other computational devices.

The routine 300 begins in block 302 by receiving an "as is" APM selection from a user. As set forth above, in one embodiment, the "as is" APM is an organized collection of graphical and numerical data that describes the current functions, processes, information elements, and other parts of a particular airline.

In block 304, the routine 300 displays the "as is" APM in response to the selection. In block 306, the routine 300 receives challenge and event selections from the user. In block 308, the routine 300 displays an "as is" event model in response to receiving the challenge and event selections.

After displaying the "as is" event model, in block 310 the routine 300 can receive product and/or service selections from the user corresponding to a "what if" case. In response to receiving these selections, the routine 300 can display a corresponding "what if" event model in block 312. In decision block 314, the routine 300 checks for any changes to the "what if" case from the user. If there are any changes, the routine 300 returns to block 310 and updates the "what if" case to reflect the changes (e.g., additions and/or deletions of products and services).

In block 316, the routine 300 receives output selections from the user. As described in greater detail below, these output selections can include requests for various forms of textual and/or graphical output including cost comparisons, time comparisons, and other forms of analyses that compare the "as is" case to the "what if" case. Such output can further include printouts of various reports such as executive summaries, business cases, and/or proposals. In block 318, the routine 300 displays and/or prints the requested output before ending.

FIG. 4 is a schematic diagram of a display page 400 for presenting aircraft fleet information in accordance with an embodiment of the invention. The fleet information relates to the particular airline identified in a column 404. The information can include, for example, the particular aircraft models in the fleet, as identified in column 406, and the total number of each model, as shown in column 408. Further, the average trip time for each model can be shown in column 410, the daily utilization time can be shown in column 412, and the mechanical schedule reliability can be shown in column 414. The display page 400 can further include an airline drop down menu 416. The drop down menu 416 can include a list of the airlines from which the user can select. By selecting one of the listed airlines, the corresponding fleet information for that airline is displayed on a corresponding version of the display page 400.

In one aspect of this embodiment, the information presented on the display page 400 can be used to generate various portions of the "as is" and "what if" event case comparisons described in greater detail below. Although particular types of information are illustrated in FIG. 4 by way of example, in other embodiments, the display page 400 and extensions thereof can include other types of information. Like many of the display pages described below, the display page 400 can include a plurality of page tabs 402 (identified individually as page tabs 402*a-f*) arranged along an upper portion of the display page 400. By selecting one of the tabs 402, the user can bring up a corresponding display page containing the information and/or functionality identified by the tab. For example, the display page 500 discussed below with reference to FIG. 5A can be displayed in response to the user selecting the APM tab 402*b*.

Figure 5A:
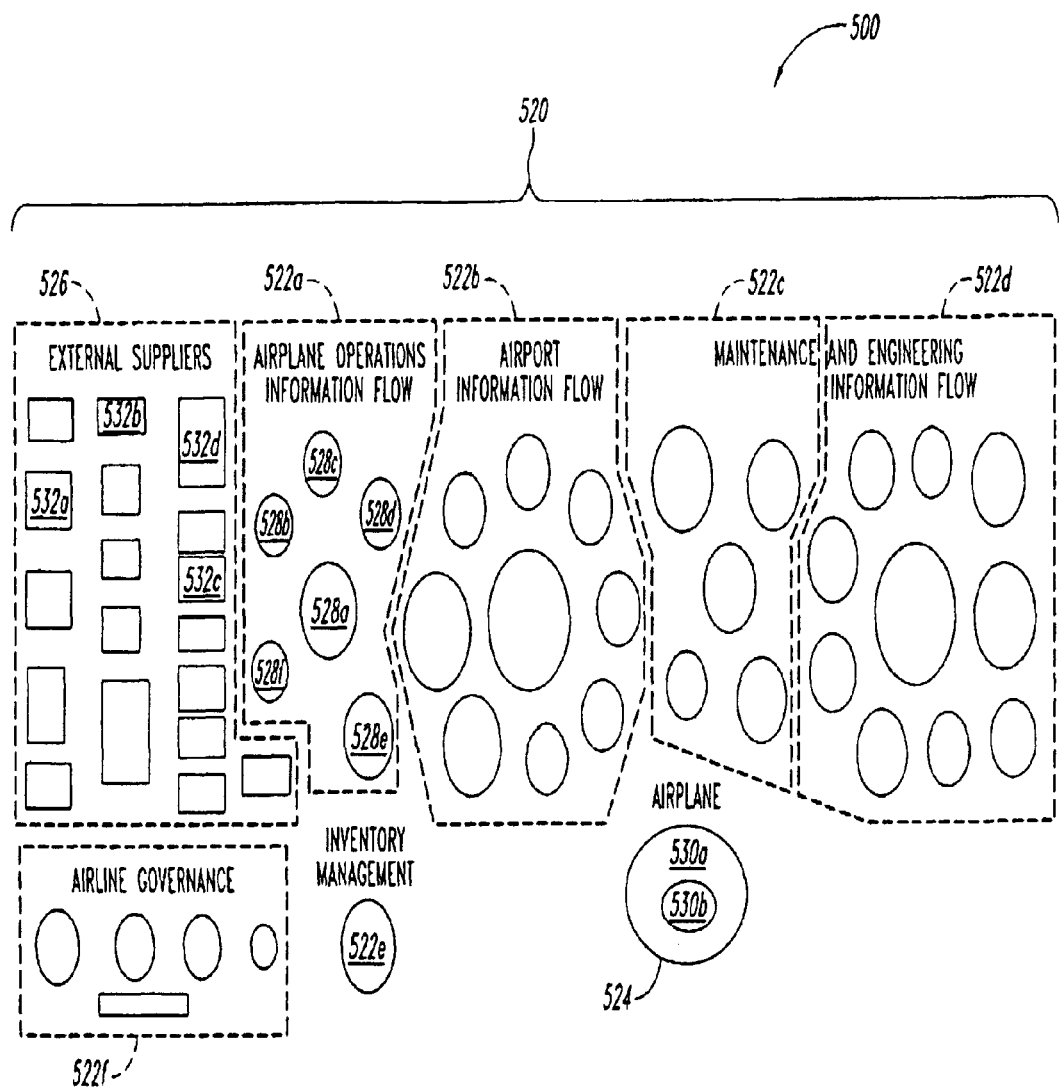
FIG. 5A is a schematic diagram of a display page illustrating an airline process model.
Figure 5B:
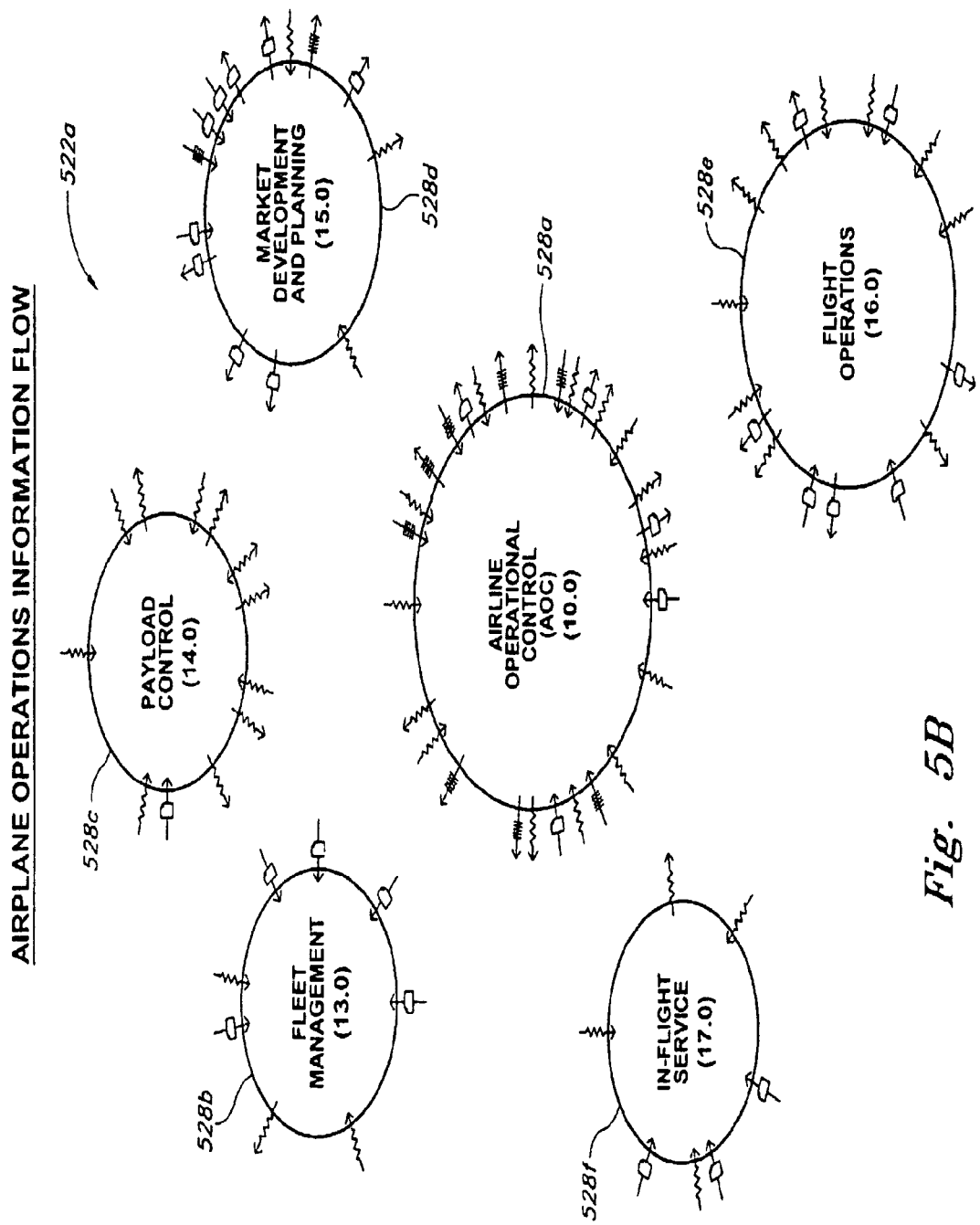
Figure 5C:
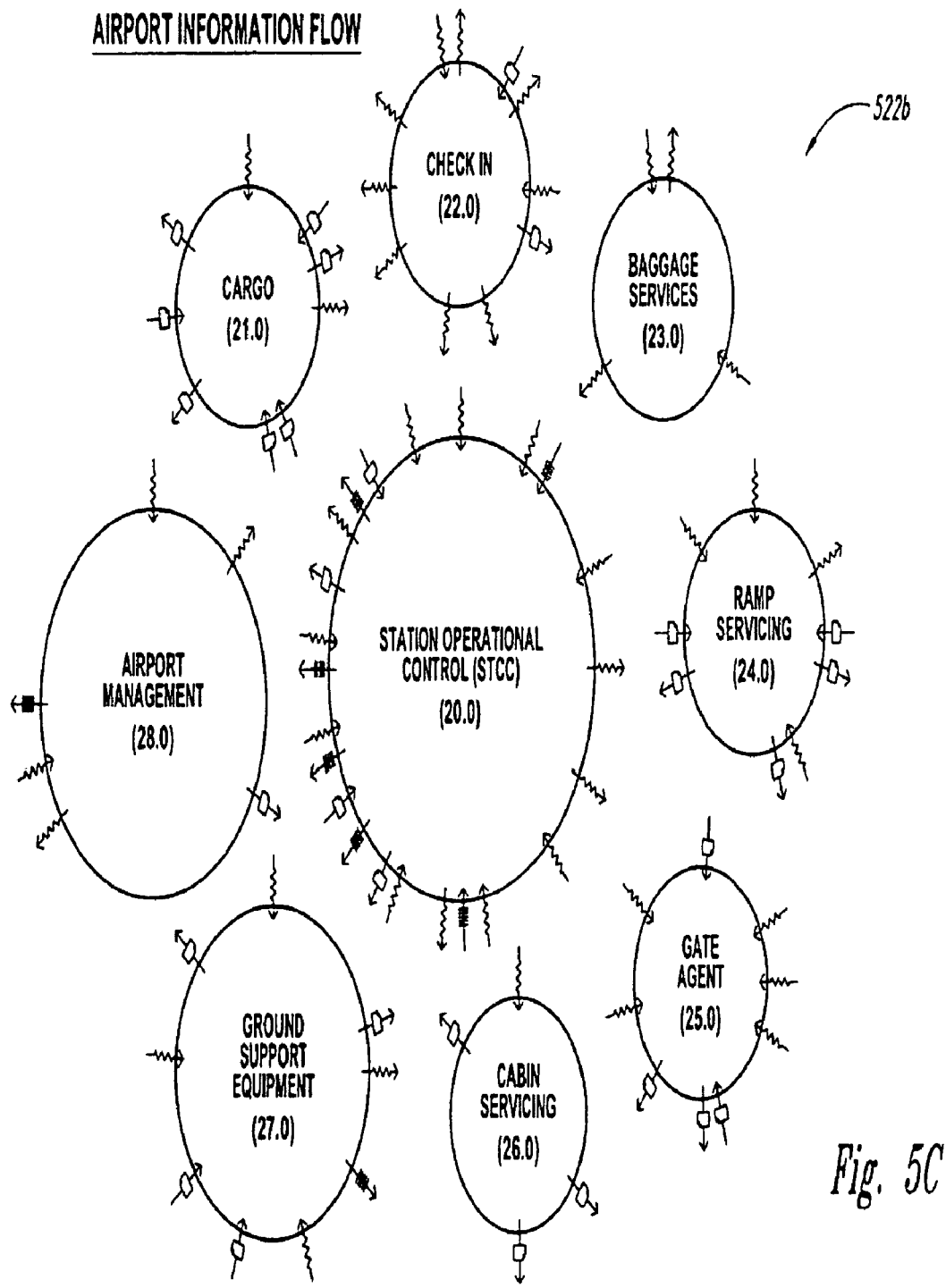
Figure 5D:
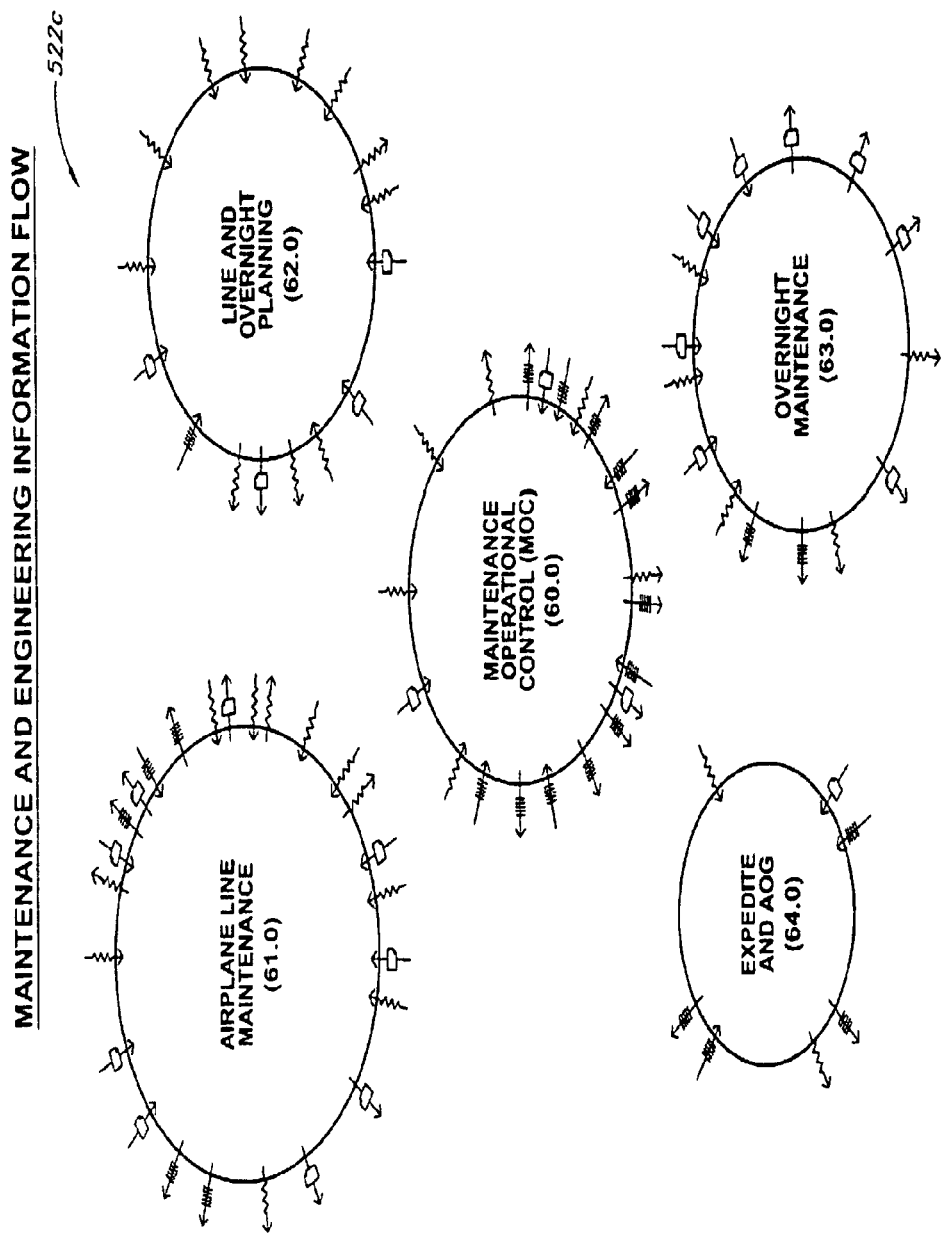
Figure 5E:
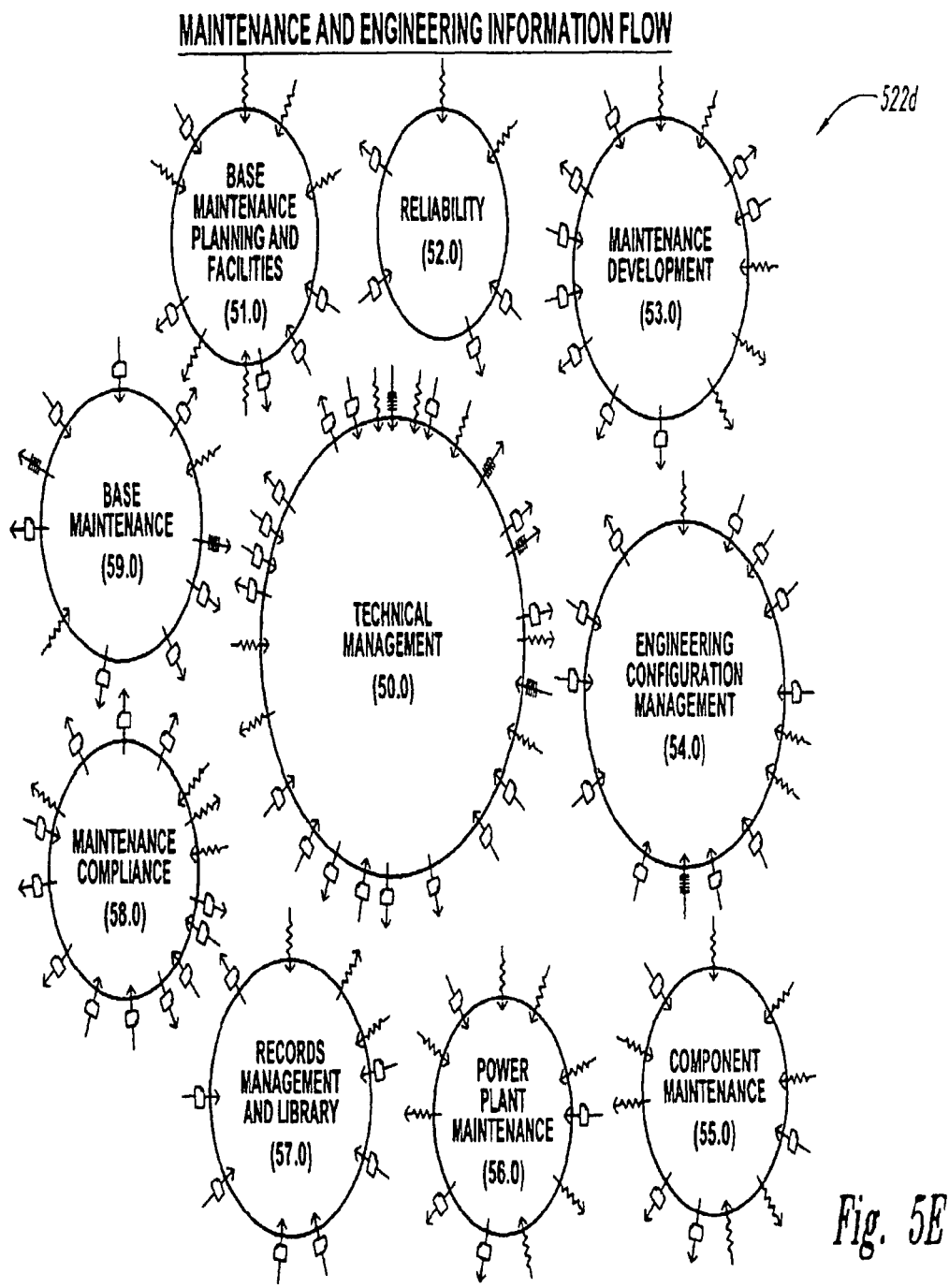
Figure 5F:
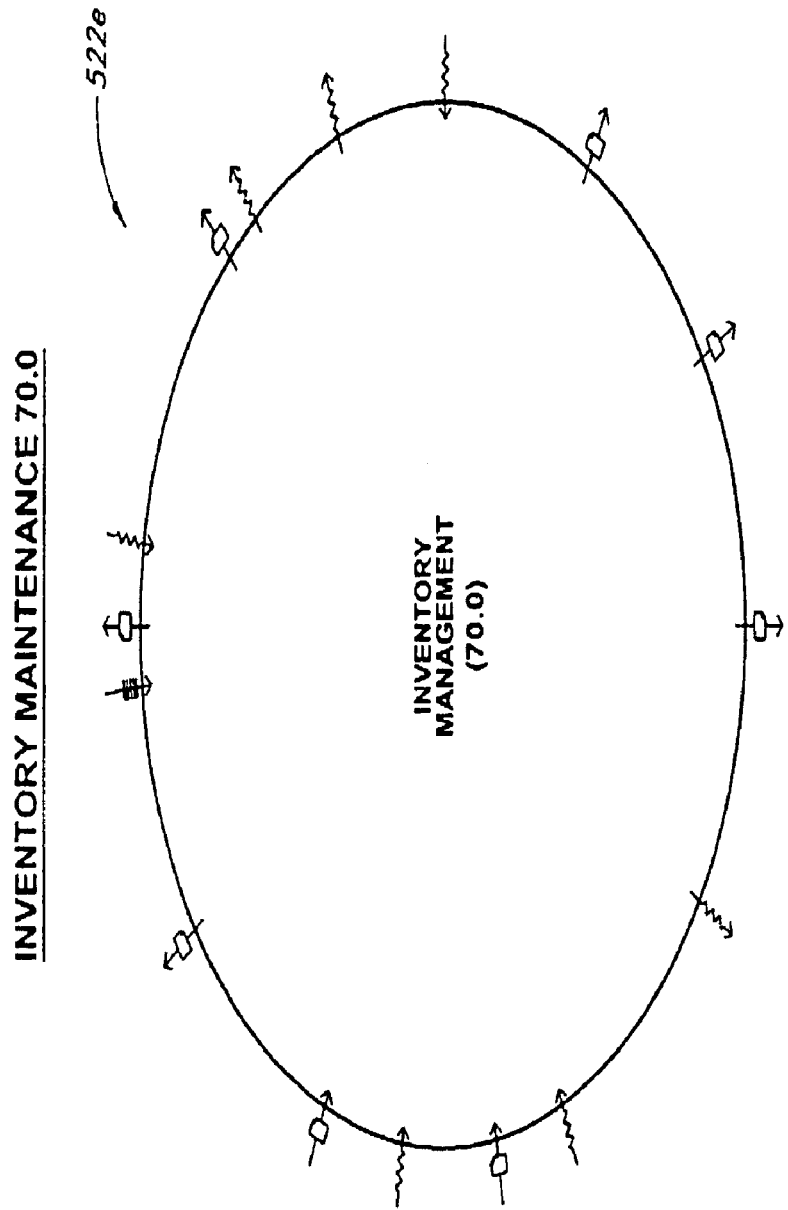
Figure 5H:
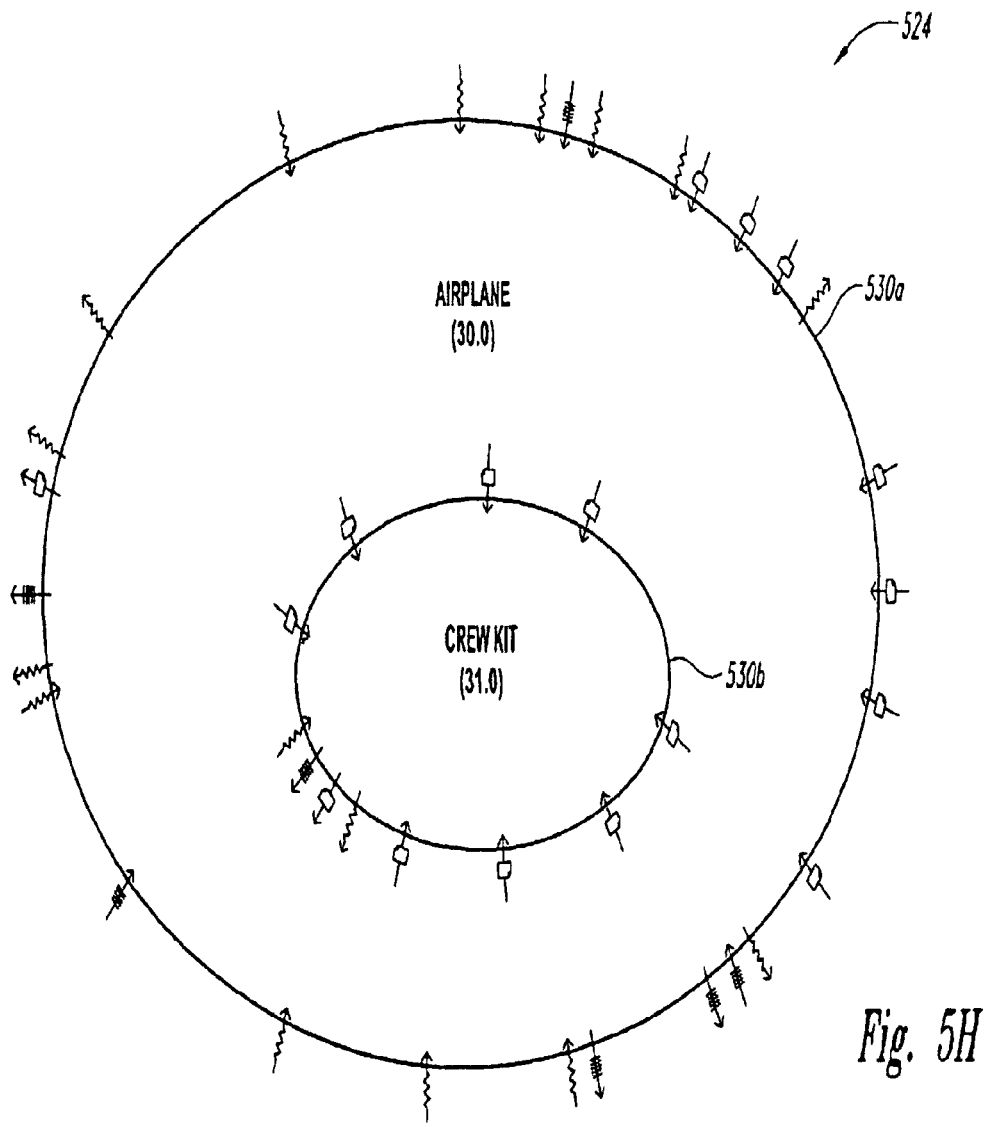
Figure 5I:
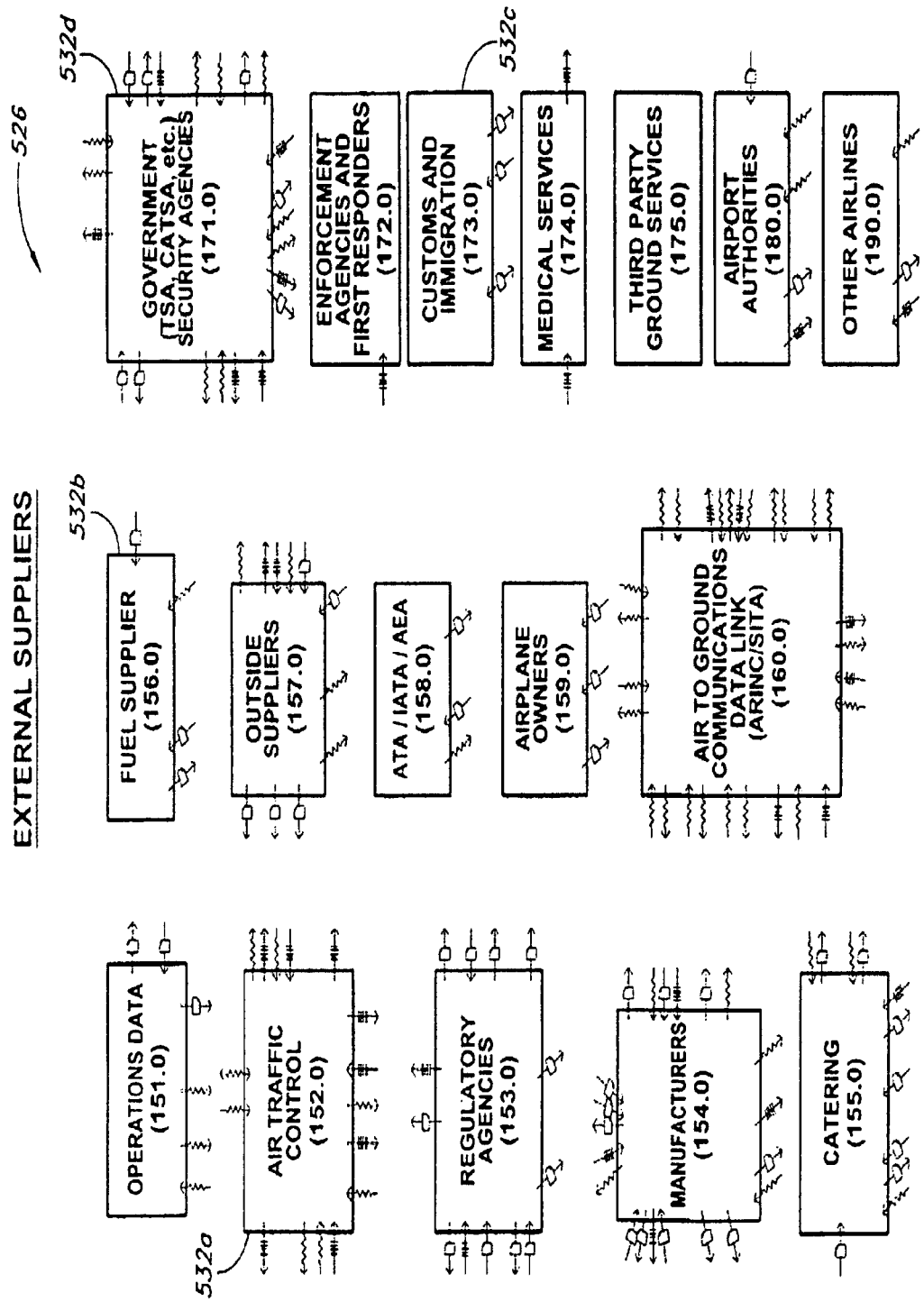

FIG. 5A is a schematic diagram of a display page 500 illustrating an airline process model 520 ("APM" 520) configured in accordance with an embodiment of the invention, and FIGS. 5B-H present enlarged portions of the APM 520 in more detail than FIG. 5A. The APM 520 is an organized data structure that graphically illustrates the various processes performed by different functional groups in a selected airline. In the illustrated embodiment, the different functional groups are represented by circles and ellipses, and are divided among different functional areas. The different functional areas can include Airline Operations 522*a*, Airport Information 522*b*, Aircraft Maintenance and Engineering 522*c*, Inventory Management 522*d*, and Airline Governance 522*e*. In other embodiments, the APM 520 can include other functional areas.

By way of example, the Airline Operations functional area 522*a* can include functional groups responsible for Airline Operational Control 528*a*, Fleet Management 528*b*, Payload Control 528*c*, Market Development and Planning 528*d*, Flight Operations 528*e*, and In-flight Service 528*f*. Each of the foregoing functional groups 528 can perform a wide variety of different functions that are related to the overall function area. These individual functions are not listed in FIG. 5 because of size constraints. By way of example, however, the Airline Operational Control functional group 528*a* can perform functions related to flight scheduling, equipment scheduling, dispatch/flight operations, cabin crew tracking and scheduling, customer service, operation analysis, etc. The payload control functional group 528c can perform functions related to, for example, airline flight schedules, cargo sales, passenger sales, etc. The flight operations functional group 528e can perform functions related to, for example, flight crew rosters, navigational data and charts, fuel on board, airplane performance data, etc.

In addition to the functional areas described above, the APM 520 can further include an Airplane Functional area 524 and an external supplier functional area 526. The Airplane Functional area 524 includes an airplane functional group 530a and a crew kit functional group 530b. The external supplier functional area 526 includes a plurality of functional groups represented by squares. These functional groups can include entities outside the airline that influence the day-to-day operations of the airline in some way. For example, in the illustrated embodiment, the external supplier functional area 526 can include outside functional groups such as air traffic control 532a, fuel suppliers 532b, customs and immigration 532c, government security agencies 532d, etc. In other embodiments, the external supplier functional area 526 can include other functional groups.

The architecture of the APM 520 described above is but one example of an airline process model configured in accordance with the present invention. Accordingly, in other embodiments, other airline process models configured in accordance with the present invention can include other arrangements of functional areas and/or functional groups. Further, in such embodiments, the functional groups can include other processes in addition to, or in place of, the processes included in the APM 520.

The foregoing description of the display page 500 provides a broad overview of the architecture of the APM 520. Additional details of the various functional areas included in the APM 520 are provided for reference in corresponding FIGS. 5B-5I. Some of the symbols illustrated in FIGS. 5B-5I are described below with reference to FIG. 6.

Figure 6:
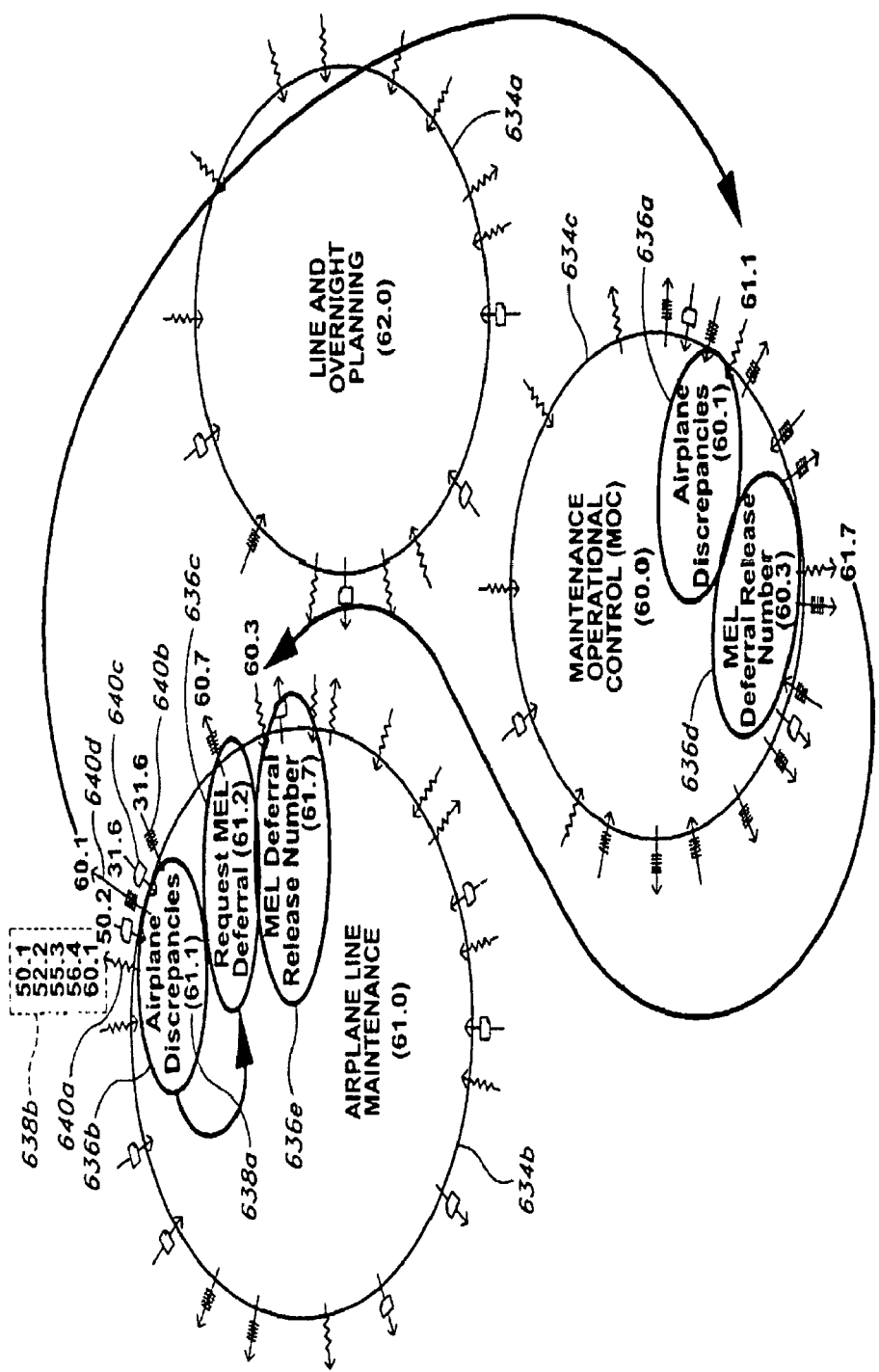
FIG. 6 is a schematic diagram of a display page illustrating an enlarged portion of the airline process model of FIG. 5 for the purpose of graphically illustrating how different functional groups in the model respond to challenges and events that occur in day-to-day operations.

FIG. 6 is a schematic diagram of a display page 600 illustrating an enlarged portion of the APM 520 of FIG. 5A. Specifically, the display page 600 illustrates the functional groups in the Aircraft Maintenance and Engineering functional area 522c that are responsible for Overnight Planning 634a, Airplane Line Maintenance 634b, and Maintenance Operational Control 634c. Each of the functional groups 634 includes a plurality of corresponding processes or functions. The Airplane Line Maintenance functional group 634b, for example, includes an Airplane Discrepancies function 636b and a request MEL (minimum equipment list) deferral function 636c. Further, the maintenance operational control functional group 634c includes, among others, an Airplane Discrepancies function 636a.

Each function in the different functional groups includes a function identifier 638. For example, the Airplane Discrepancies function 636b includes a first function identifier 638a (i.e., "61.1"). The function identifiers 638 are used to designate the destinations of various types of information (identified individually as information flows 640a-d) that flow between the different functional groups. Each individual information flow 640 has a particular graphical representation that represents the particular type of information that is exchanged. Referring to the Airplane Discrepancies function 636b, for example, the first information flow 640a is represented by a first line type (e.g., a jagged line) to illustrate that digital information is sent from the Airplane Discrepancies function 636b. Because the arrow on the jagged line points away from the Airplane Discrepancies function 636b, this indicates that the digital information is provided from the Airplane Discrepancies function 636b to the other functions identified by the second function identifiers 638b.

The broken line and the associated arrow of the second information flow 640b indicates that voice data is transmitted to the Airplane Discrepancies function 636b from the function having the identifier 31.6 (for reference, the function identifier 31.6 corresponds to a logbook entries function included in the crew kit functional group 530b illustrated in FIGS. 5A and 5G). The page symbol illustrated of the third information flow 640c indicates that paper copies of information are transmitted to the Airplane Discrepancies function 636b from the 31.6 function. Further, the broken line and the outwardly pointing arrow of the fourth information flow 640d indicates that the Airplane Discrepancies function 636b transmits voice data to the 60.1 function (i.e., the Airplane Discrepancies function 636a of the maintenance operational control functional group 634c).

As mentioned above, the APM 520 (FIG. 5A) can be used to graphically illustrate how the different functional groups respond to challenges and events that occur in the day-to-day operations of the airline. The following example illustrates one way the portion of the APM 520 shown in FIG. 6 can be used in this manner. In this example, an airplane discrepancy occurs and a line mechanic troubleshoots the discrepancy as part of the Airplane Discrepancies function 636b. The line mechanic then determines if an MEL deferral is the appropriate response in a Request MEL Deferral function 636c. Next, the line mechanic notifies the Airplane Discrepancy Function 636a via voice data that a discrepancy was reported. The MEL Deferral Release Number function 636d of the Maintenance Operational Control functional group 634c then sends the line mechanic an MEL deferral number via digital data. The line mechanic receives the digital data in a corresponding MEL Deferral Release Number function 636e of the Airplane Line Maintenance functional group 634. The line mechanic then walks the MEL deferral number to the airplane as paper data traveling from the MEL deferral release number function 636e to the log book entry function of the Crew Kit functional group 530b (FIG. 5G).

As the foregoing example illustrates, the APM embodiment described in FIG. 6 provides a useful graphical tool for visualizing the various processes that must be carried out by the airline to respond to a particular problem or event. As described in greater detail below, this feature of the APM can also be used to identify inefficient processes that can be improved by implementing various products and services. Further, this feature is also useful for visualizing and contrasting how the products and services, if implemented, can improve the existing "as is" processes.

Figure 7:
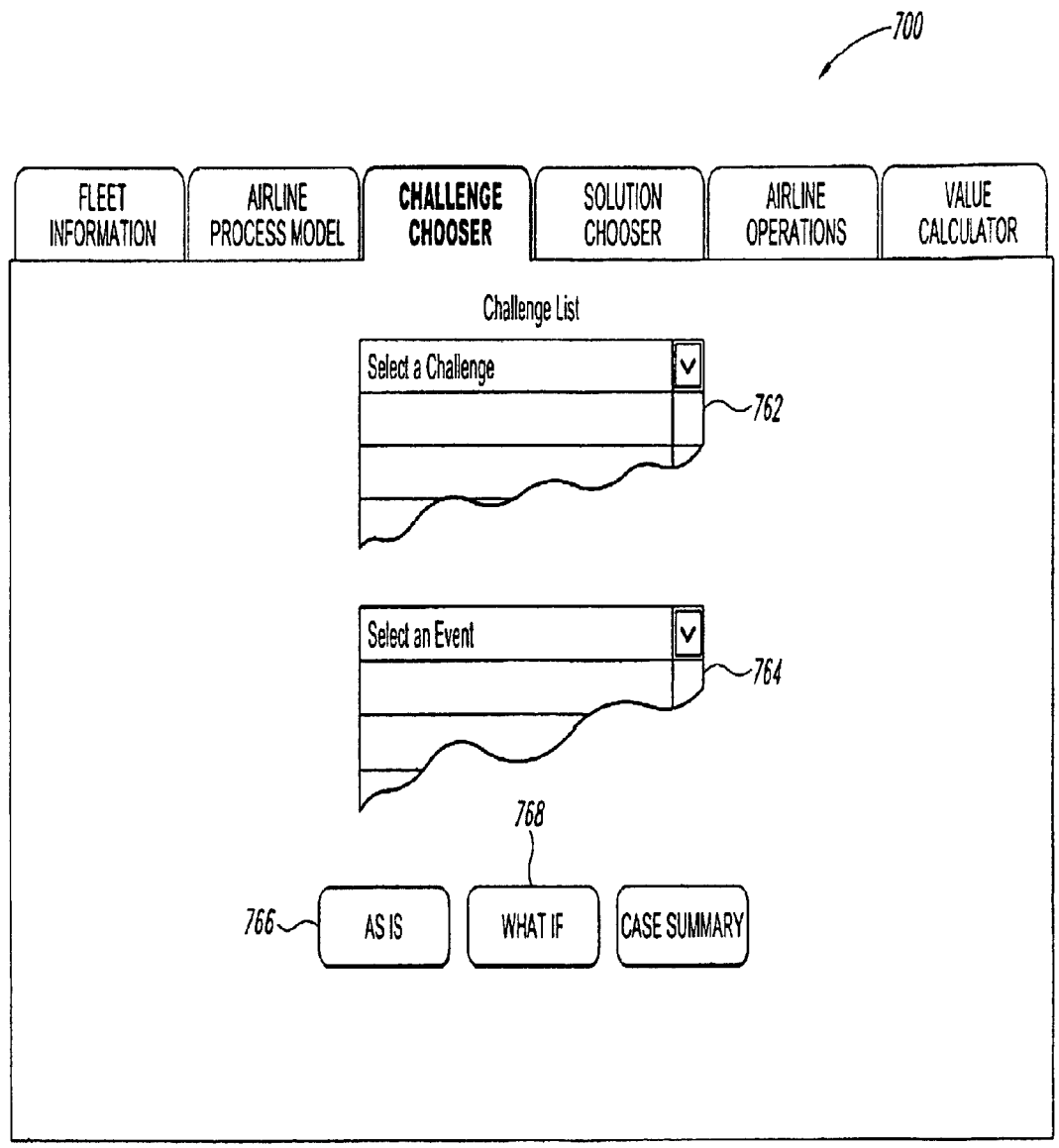
FIG. 7 is a schematic diagram of a display page for selecting a "challenge" and an associated "event".

FIG. 7 is a schematic diagram of a display page 700 for selecting a "challenge" and an associated "event" in accordance with an embodiment of the invention. The display page 700 can include a challenge drop-down menu 762 and an event drop-down menu 764. The user can begin by selecting a challenge from the challenge drop-down menu 762. As explained above with reference to FIG. 2, a "challenge" is an operational problem facing the airline that is associated with one or more related "events." Examples of challenges include "delays and cancellations," "maintenance program compliance," "crew productivity," and "air traffic routing." Next, the user can select an associated event from the event drop-down menu 764. An event is an airline operational circumstance to which the APM 520 (FIG. 5A) responds, such as "fuel quantity indicator failure." After making these selections, the user can select an "as is" button 766 to bring up an "as is" event model that graphically illustrates how the relevant portion of the APM 520 responds to the selected event.

Figure 8:
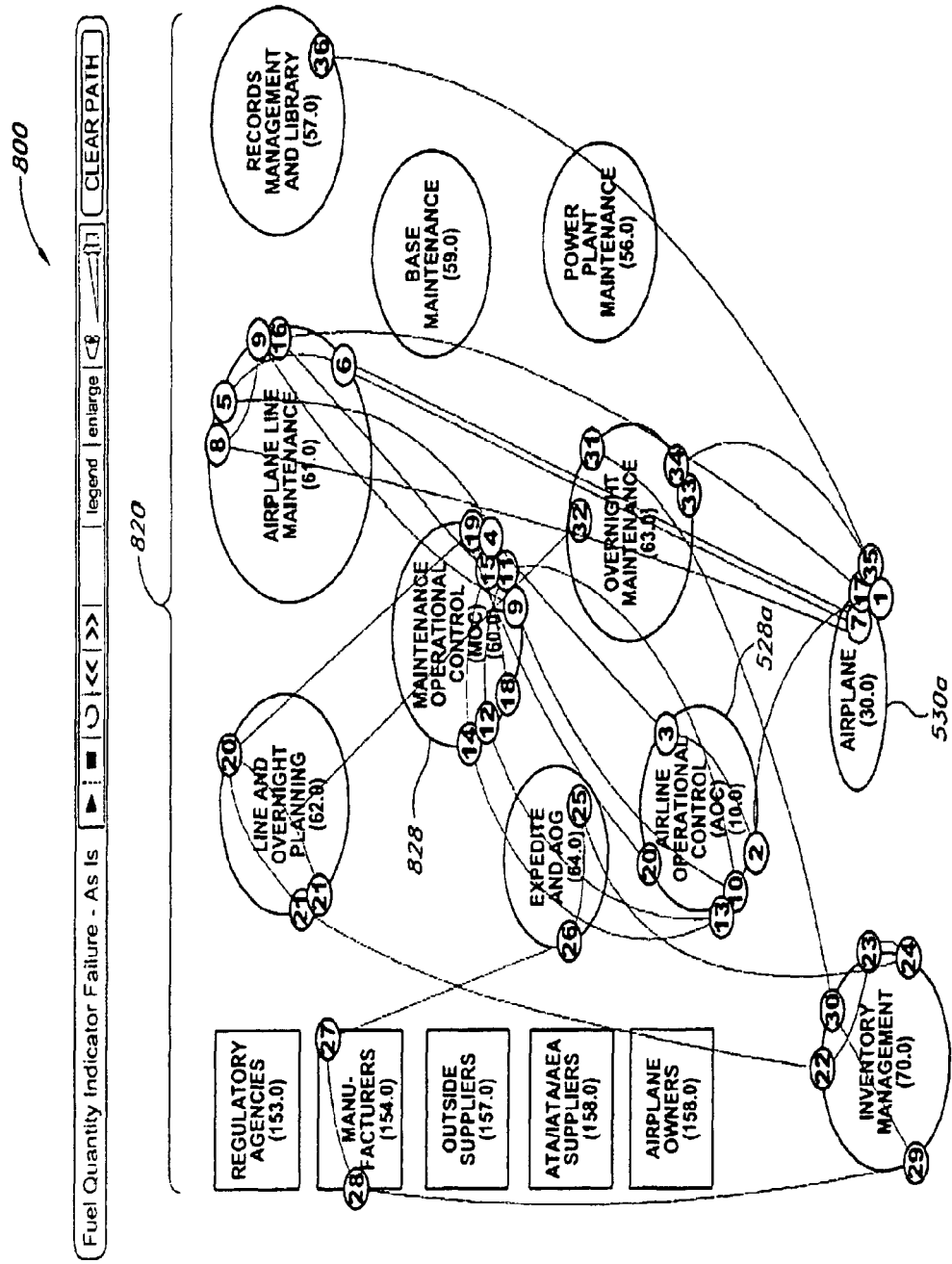
FIG. 8 is a schematic diagram of a display page that graphically illustrates an "as is" event model.

FIG. 8 is a schematic diagram of a display page 800 illustrating an "as is" event model 820 configured in accordance with an embodiment of the invention. The "as is" event model 820 graphically illustrates how the relevant functional groups in the APM 520 (FIG. 5A) respond to the fuel quantity indicator failure event selected via the display page 700 of FIG. 7. In the illustrated example, the relevant functional groups include the airplane functional group 530*a*, the Airline Operational Control functional group 528*a*, and a maintenance operational control functional group 828, among others. Each of these functional groups performs functions in response to the fuel quantity indicator failure. These individual functions are identified by numbers that correspond to the sequence in which the functions are performed. For example, the first step in response to the fuel quantity indicator failure (identified by the number 1) is performed by the Airplane functional group 530*a* when the pilot report is recorded (via voice transmission) in the log book; the second step (identified by number 2) is performed by the Airline Operational Control functional group 528*a* when the pilot reports the problem via another voice transmission; and so on from there.

Figure 9:
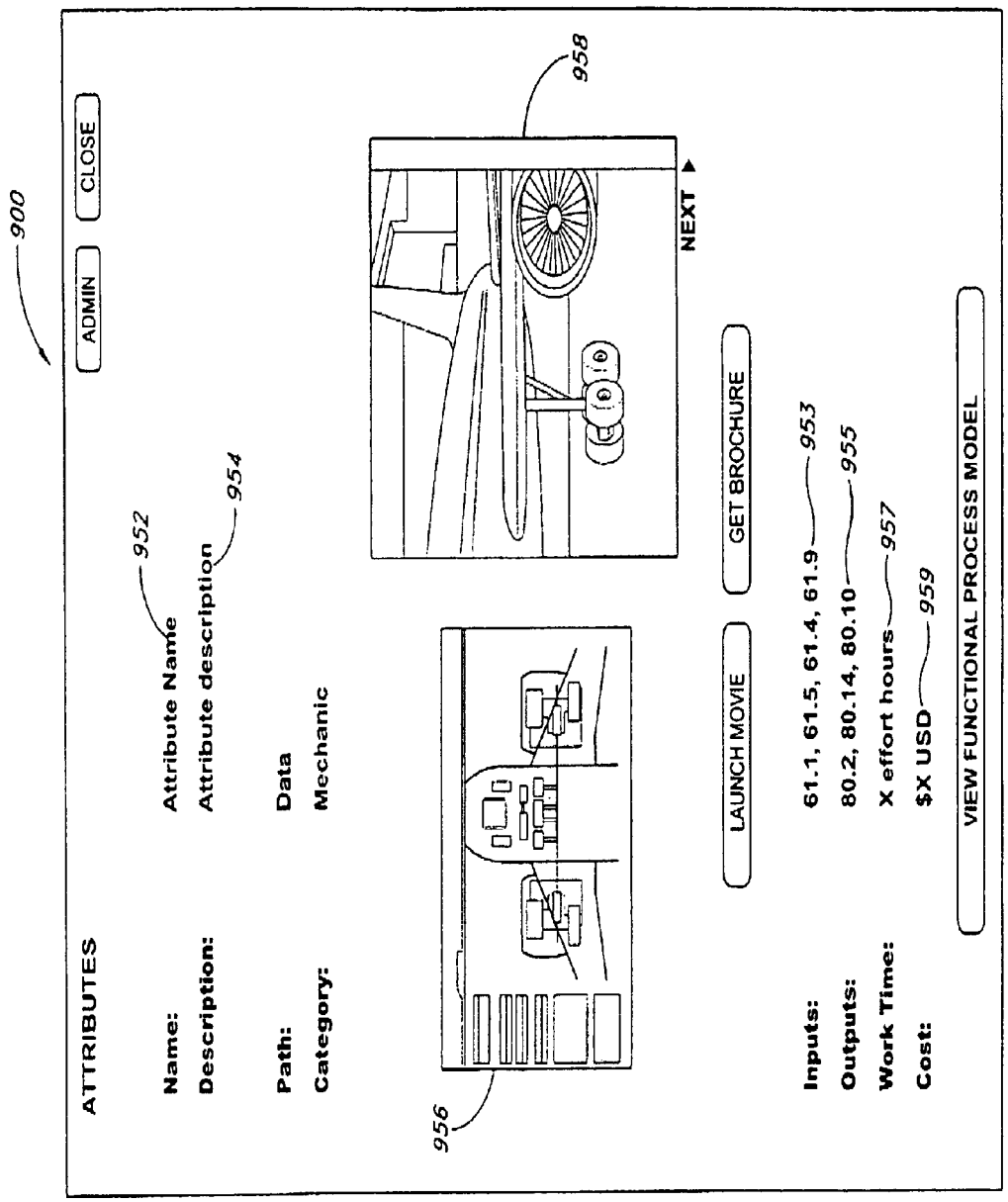
FIG. 9 is schematic diagram of a display page for reviewing and/or editing attributes of a particular function.

Each of the functional steps noted by a number in FIG. 8 includes attributes that describe the function performed. In one aspect of this embodiment, the user can review and/or edit these attributes with a display page 900 schematically illustrated in FIG. 9. In one embodiment, the user can bring up the display page 900 for a particular function by simply clicking on the number that corresponds to that function on the "as is" event model 820. Referring to FIG. 9, the display page 900 can include a number of data fields with which the user can alter the various attributes associated with the selected function. For example, the attributes display page 900 includes a name field 952 and an attribute description field 954. The attribute display page 900 also includes a movie feature 956 and a brochure feature 958. The movie feature 956 allows the user to view a movie describing aspects of the particular function. Similarly, the brochure feature 958 allows the user to view and/or order a hard copy of a brochure describing the particular function.

In addition to the foregoing, the attribute display page 900 also includes an input field 953, an output field 955, a work time field 957, and a cost field 959. The input field 953 displays the current set of functions that provide input to the selected function. Similarly, the output field 955 lists the current set of functions that receive output from the selected function. The work time field 957 shows the number of man-hours required to perform the function, and the cost field 959 shows the cost in dollars of performing the function. By editing the attribute display page 900, the user can automatically modify the corresponding airline process model as required to accurately reflect the actual processes performed by the airline.

Returning to FIG. 8, the "as is" event model 820 assumes that no new products or services have been implemented by the airline to facilitate the various operational processes and streamline how the airline responds to different challenges and events. As a result, one advantage of the "as is" event model 820 is that it allows the airline operator to easily see the inefficiencies that may exist in Airline Operations and the relative need for products and services that can streamline these operations. If the airline operator is interested in seeing how various products and services can improve the situation, the user can do so by returning to the display page 700 described above with reference to FIG. 7 and selecting a "what if" button 868 (see FIG. 7).

Figure 10:
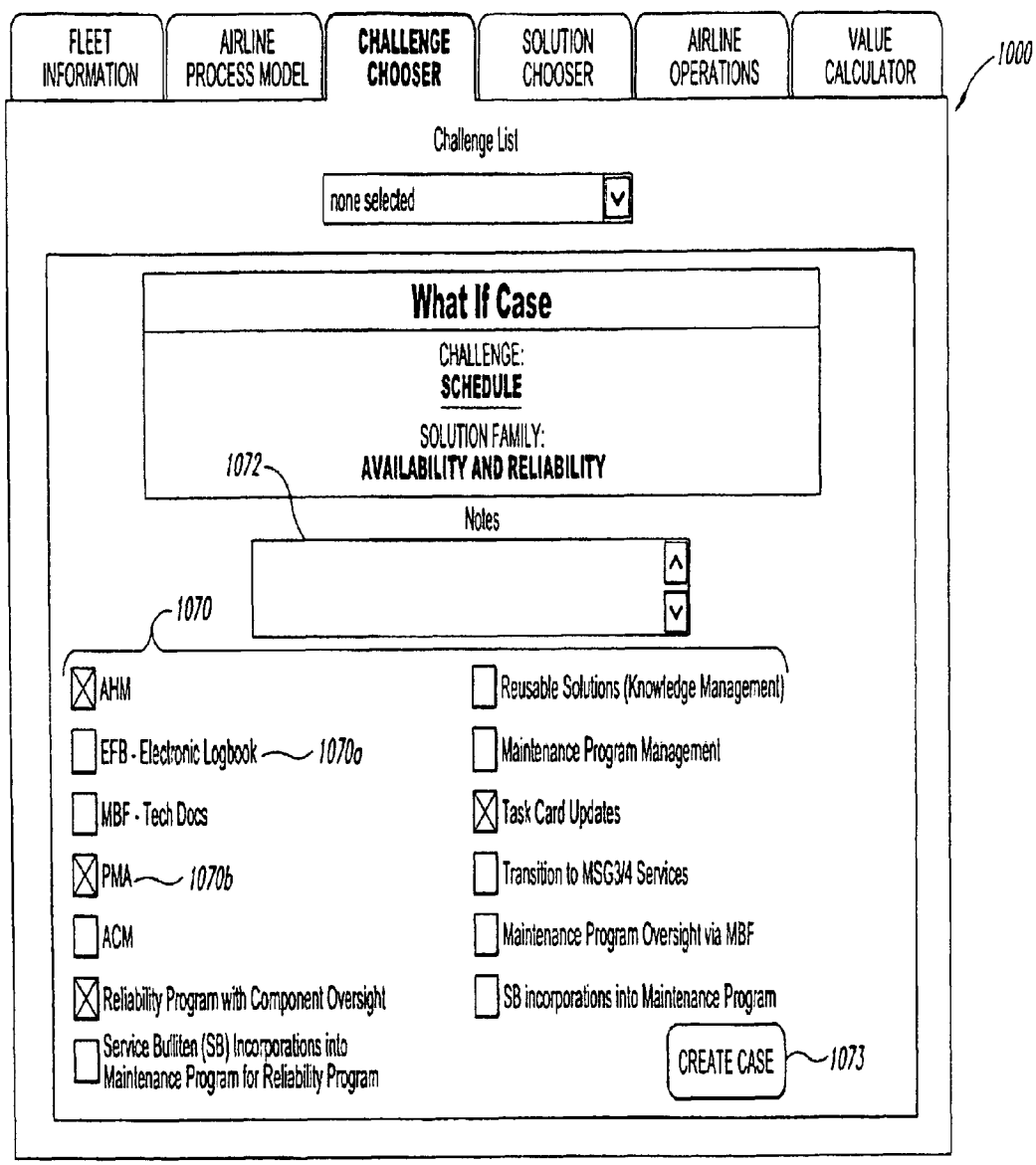
FIG. 10 is a schematic diagram of a display page for selecting a "what if" case.

FIG. 10 is a schematic diagram of a display page 1000 for selecting a "what if" case in accordance with an embodiment. The display page 1000 includes a list of products and services 1070 from which the user can select. The products and services 1070 can include various software and database programs that automate and/or partially automate various processes carried out by the airline functional groups. For example, EFB-electronic log book 1070*a* is an Internet enabled log book that allows pilots to enter information about each flight electronically. PMA 1070*b* is a portable maintenance aid (e.g., a laptop-like device) that aircraft mechanics can carry with them onto the airplane when conducting maintenance, repairs, etc. This tool allows them to electronically access drawings, maintenance instructions, task cards, etc. without needing to get off the airplane and find hard copies of the information. As a result, this product can greatly increase the efficiency of the mechanic.

After reviewing the different products and services 1070, the user can select the products he or she wishes to implement by checking the adjacent box. In addition, the user can also enter notes about the particular "what if" case in an note field 1072. Once the user has selected the desired products and services and entered any relevant notes, the user can select a "create case" button 1073 to create a corresponding "what if" case.

Figure 11:
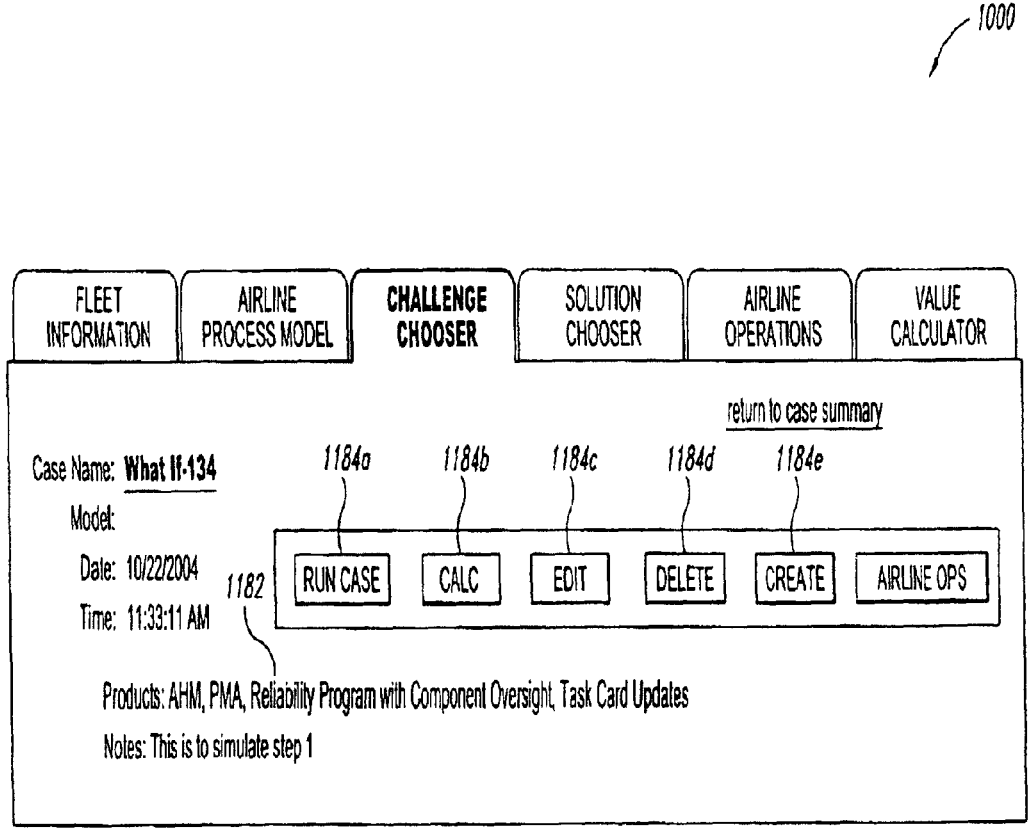
FIG. 11 is a schematic diagram of a display page listing user options after a "what if" case has been created.

FIG. 11 is a schematic diagram of a display page 1100 listing options for the user after a "what if" case has been created. The display page 1100 includes a case name field 1180 that identifies the particular "what if" case, and a products field 1182 that lists the selected products that the user wishes to implement in the "what if" case. In addition, the display page 1100 further includes a plurality of options buttons 1184. The option buttons include, for example, a run case option 1184*a*, a calculate option 1186*b*, an edit option 1184*c*, a delete option 1184*d*, and a create option 1184*e*. In this embodiment, selecting the run case option 1184*a* brings up a display page that graphically illustrates a "what if" event model that corresponds to the selected "what if" case. Selecting the edit option 1184*c* enables the user to edit the selected "what if" case. Selecting the delete option 1184*d* enables the user to delete the particular case, and selecting the create option 1184*e* enables the user to create a new "what if" case.

Figure 12:
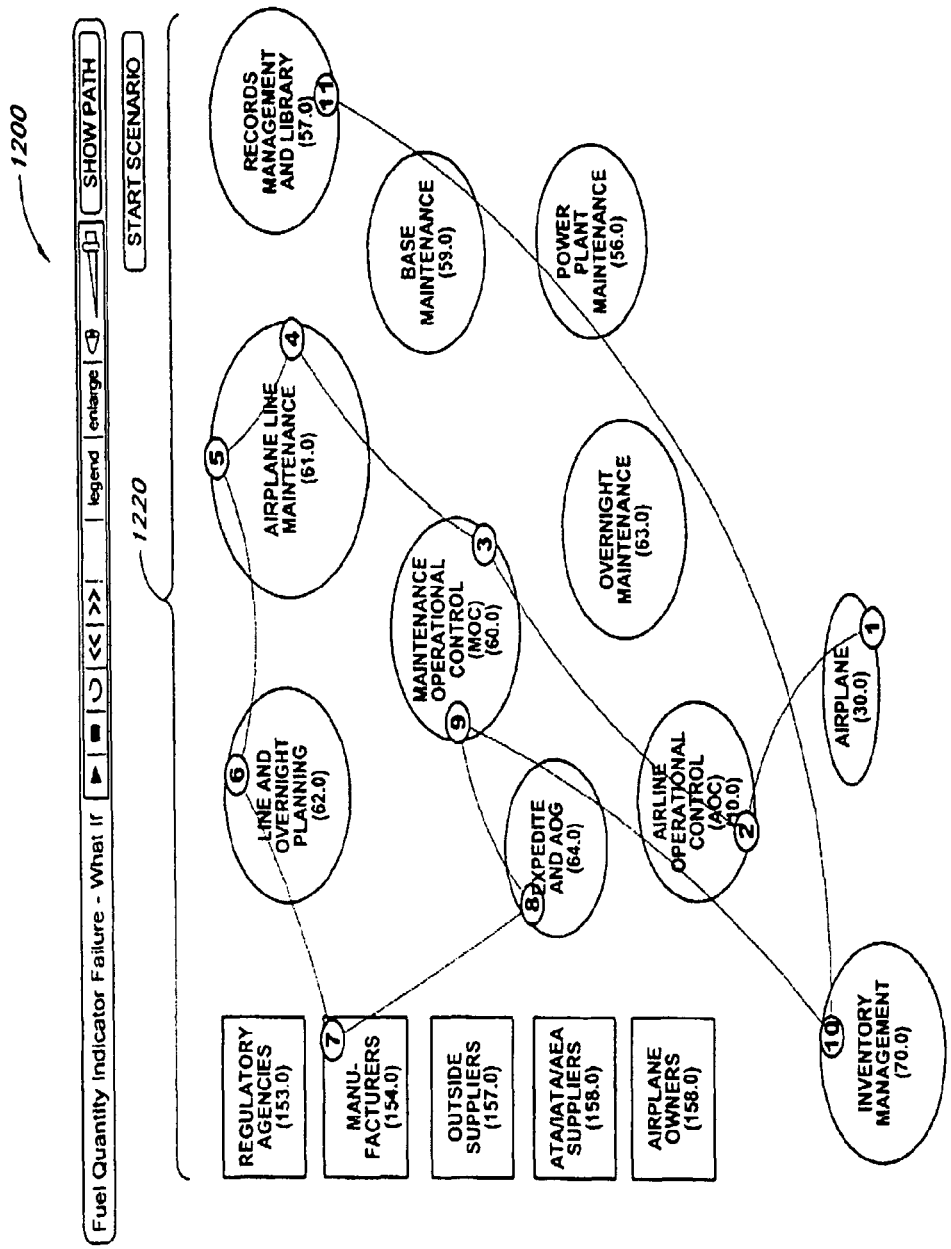
FIG. 12 is a schematic diagram of a display page that graphically illustrates a "what if" event model.

FIG. 12 is a schematic diagram of a display page 1200 graphically illustrating a "what if" event model 1220 corresponding to the "what if" case selected in FIG. 10. Comparing the "what if" event model 1220 to the baseline "as is" event model 820 (FIG. 8) clearly illustrates that implementation of the selected products and services would greatly reduce the number of functional steps the airline takes to respond to the particular challenge and event selected in FIG. 7 (i.e., the fuel quantity indicator failure). Accordingly, this tool can provide a sales agent with a means for quickly and convincingly demonstrating the benefits of implementing the different products and services to a prospective airline.

FIG. 13 is a schematic diagram of a display page 1300 that includes a list 1360 of existing "as is" and "what if" event cases configured in accordance with an embodiment of the invention. A case identifier for each case is provided in a case column 1302. User-entered notes for each case can also be provided under the corresponding case identifier. For "what if" cases, the products selected by the user are listed in an adjacent product column 1304. In one embodiment, the display page 1300 can be used as a reference for selecting from previously-run event cases. If the user wishes to view an event model corresponding to a particular case, the user can do so by selecting an appropriate select button 1306.

In addition to the graphical methods described above for comparing a "what if" event model that implements various products and services to an existing "as is" event model, the present invention also includes various methods and systems for presenting cost, schedule, and other data that illustrate the benefits of the selected products and services. For example, returning to FIG. 11, selecting the calc button 1084*b* can bring up a value calculator display page 1400 as schematically illustrated in FIG. 14.

Referring to FIG. 14, the display page 1400 can include a number of spreadsheet fields 1470 (identified individually as spreadsheet fields 1470*a-c*) that compare costs associated with an "as is" model to costs associated with a corresponding "what if" model. For example, the model delay cost field 1470*a* can compare the costs of various delays in the "as is" model to the costs of delays in the "what if" model for different aircraft types. The fleet value field 1470*b* includes similar data corresponding to the annual value, the annual cost, the net value and the benefit cost/ratio for the delays. The fleet profitability field 1470*c* includes data that compares the year-by-year cost to the customer of the selected solutions (i.e., the selected products and services) vs. the year-by-year savings from implementing the solutions. As those of ordinary skill in the art will appreciate, the forgoing spreadsheets are merely representative of the various types of tools that can be included with the present invention to facilitate the comparison and/or analysis of the different product and/or services.

Figure 15:
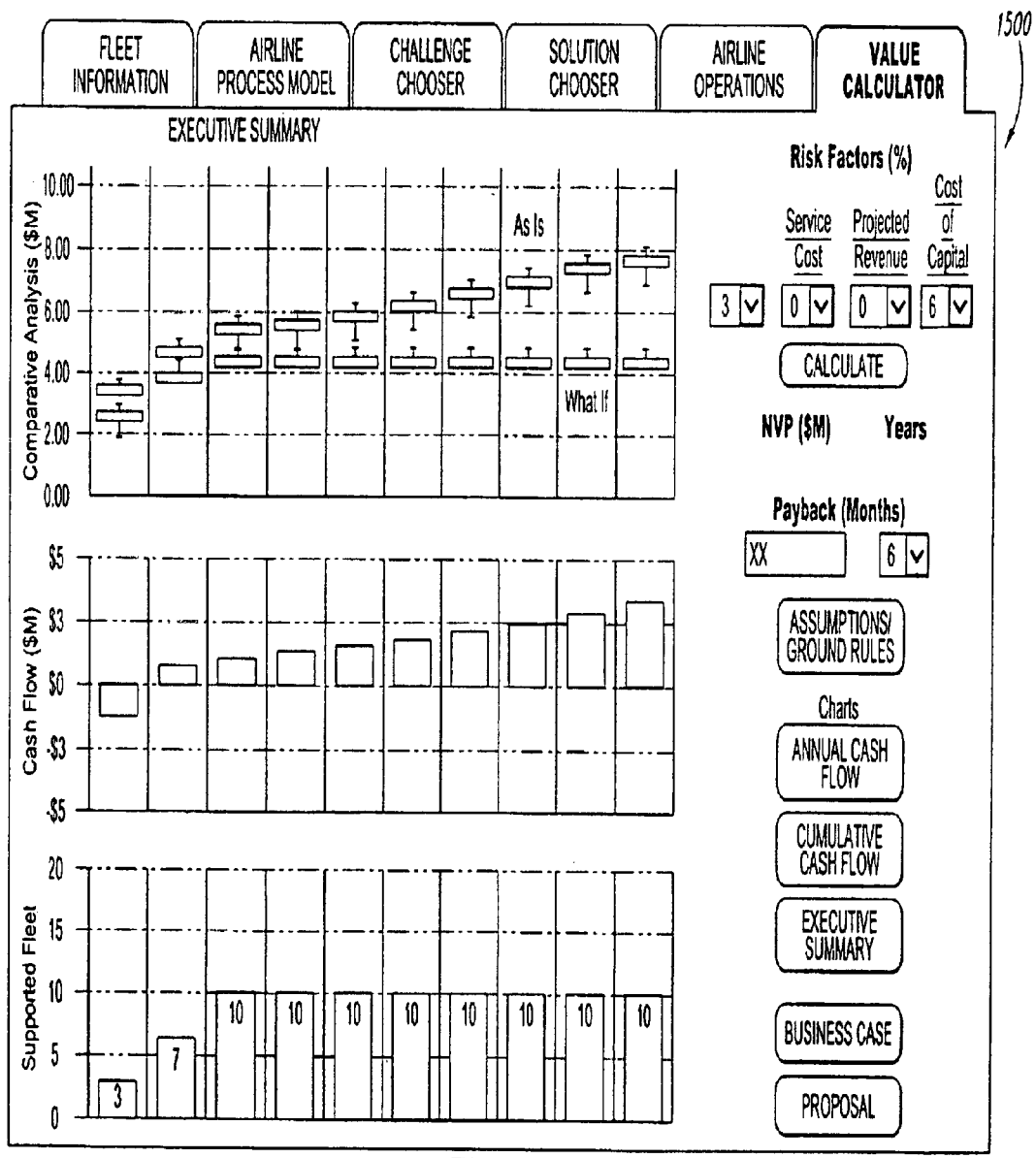
FIG. 15 is a schematic diagram of a display page that graphically describes the results of comparative analyses between an "as is" case and a corresponding "what if" case.
Figure 17:
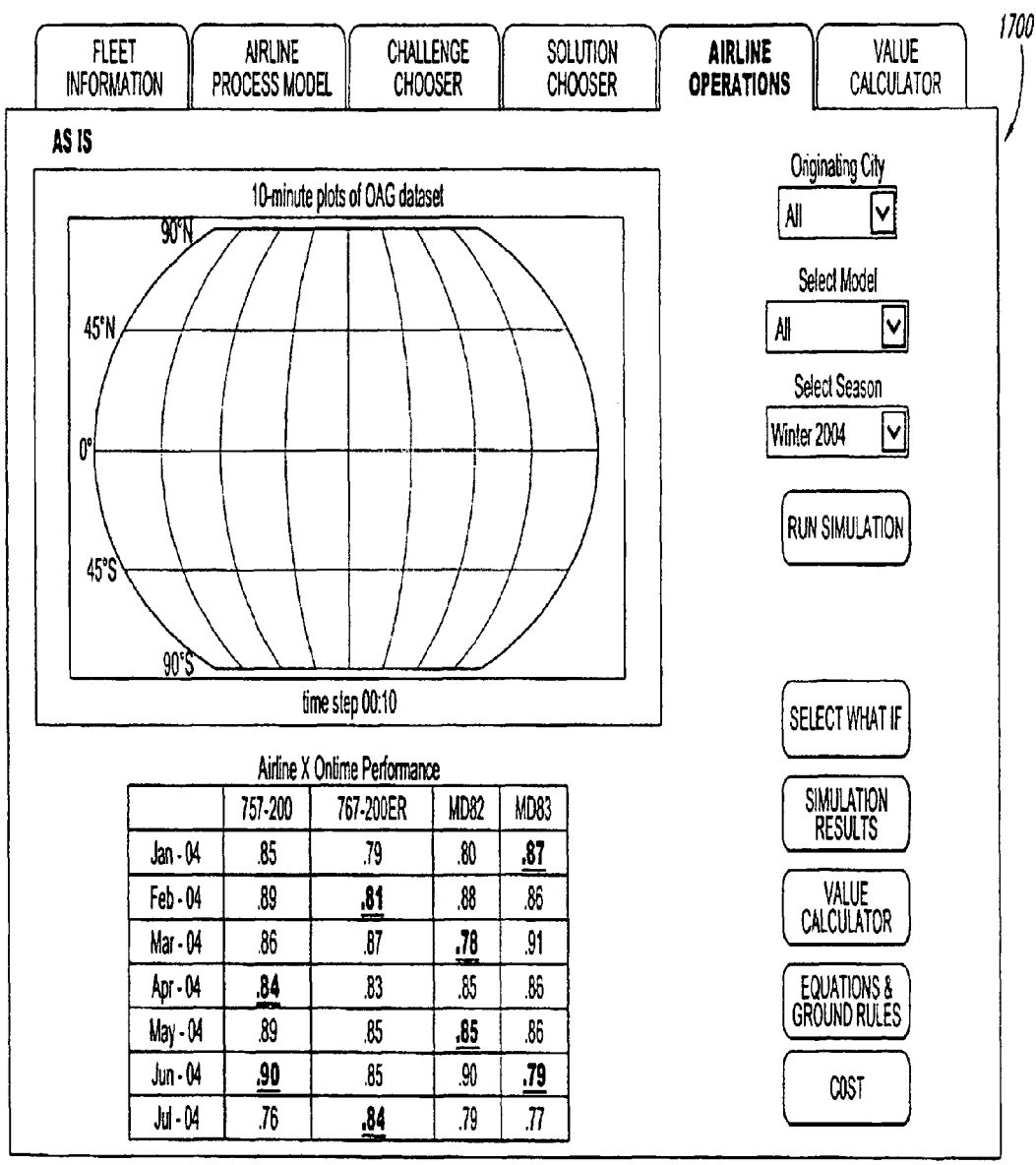
FIG. 17 is a schematic diagram of a display page providing airline schedule performance data.

In addition to the spreadsheet fields 1470 described above, the display page 1400 can also include a number of page selectors that can take the user to other forms of output related to the selected products and services. For example, by selecting a proposal button 1418, the user can request a print out of a products and services proposal to give the prospective customer. By selecting a business case button 1420, various portions of the relevant data described above can be assembled into a report with associated value analyses that can be printed out for the customer. Similarly, by selecting an executive summary button 1422, the user can request additional spreadsheet data, such as that illustrated in the display page 1500 of FIG. 15 which graphically describes the results of comparative analyses between the "as is" case and the "what if" case. The executive summary can additionally include spreadsheet data, such as that illustrated in a display page 1600 of FIG. 16, which allows the user to "scale-up" the benefits associated with the selected products and services for various portions of the current airline fleet and for future fleet growth. The executive summary can further graphical data and schedule performance data, such as that illustrated in a display page 1700 of FIG. 17.

Figure 18:
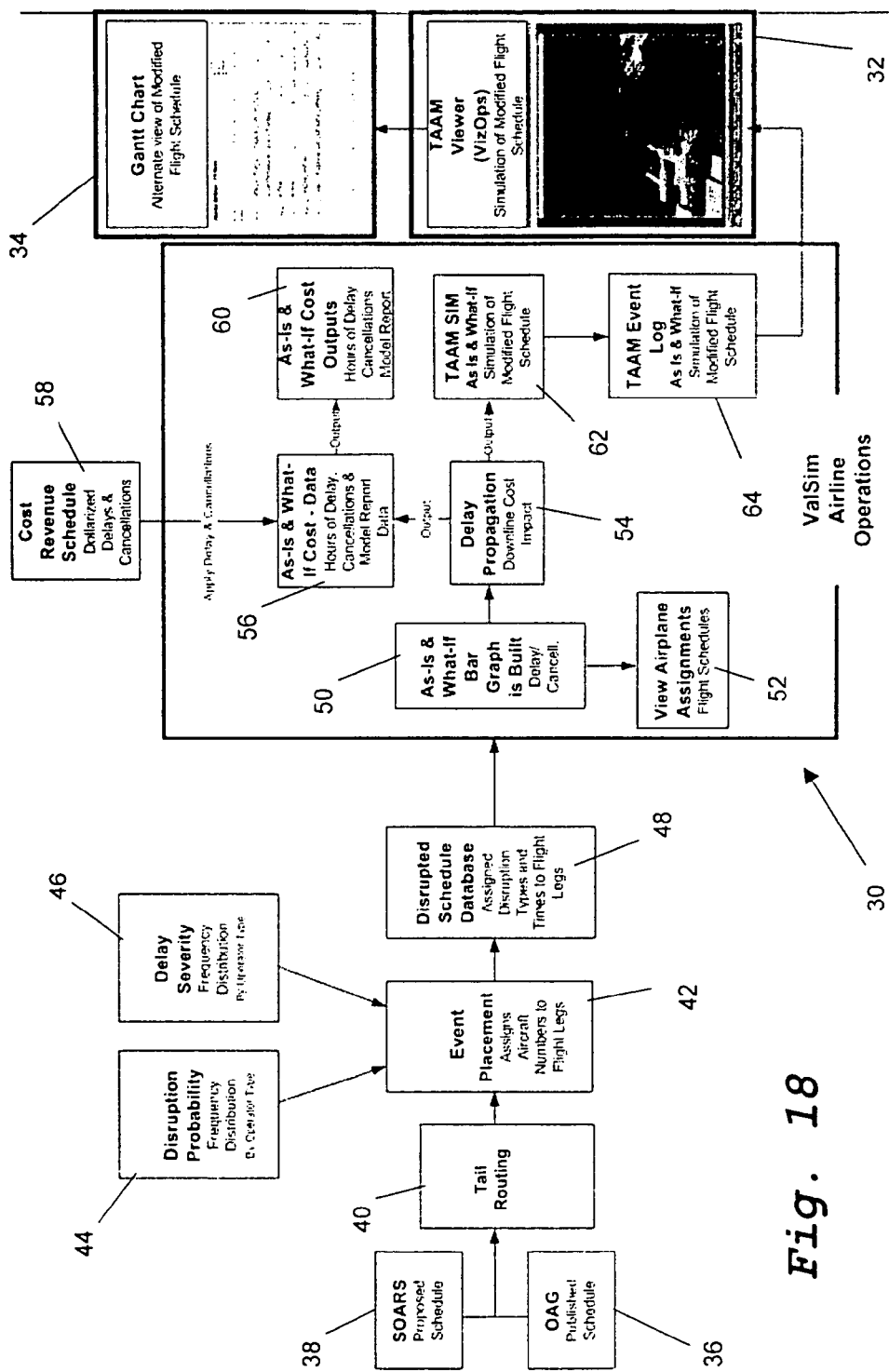
FIG. 18 is a combined flowchart and block diagram showing the steps of the method forming the preferred embodiment of the invention.

Referring first to FIG. 18, the present invention involves a method of allowing visualization of airline flight schedules and airline flight operations that permits demonstration of the effect of both disruptions in a schedule and product solutions that reduce or eliminate the effects of the disruptions. The method includes the generation of certain data and the use of certain simulation operations generally indicated by numeral 30 which allow a customer to view simulated airline operations data as well as 4-D (3-D plus time) displays of simulated operations themselves. As will be discussed later in more detail, the screen display 32 depicts a simulation of flight operations reflecting the implementation of a proposed product or service solution which reduces the effects of flight disruptions. In screen 32, a single frame is captured of a moving display, showing aircraft at gates of an airport. Screen 34 displays certain data representing a modified flight schedule corresponding to the 4-D simulation shown in screen 32.

The first step in the method of the present invention involves selecting a flight schedule which normally comprises a plurality of flights from pre-selected origins to preselected destinations, some of which may have multiple flight legs. For purposes of the intended simulation, a particular flight schedule for a customer may be selected from the official airline guide (OAG) 36, which is a publicly disseminated, comprehensive schedule of flights for most of the airlines throughout the world. Alternatively, the flight schedule may be selected from a customer's internal airline schedule 38 designated as "SOARS", that is based on assumed or hypothetical scheduled information provided by the customer. In either event, the next step at 40 involves assigning specific aircraft numbers to each flight leg in the selected schedule. This process sometimes referred to as "tail routing." The assigned aircraft number may or may not be the aircrafts registration number. Normally the customer will provide the aircraft number information that is used for assigning aircraft to flights listed in the flight schedule. Alternatively, a pre-selected scheme may be used to assign aircraft numbers to each flight leg, such as a first in, first out assignment scheme.

The next step in the method shown at 42 involves assigning aircraft numbers to each of the flight legs in the selected flight schedule, and introducing an initial disruption event for each flight leg. Disruptions in the flight legs are assumed events based on statistical information which can be derived, from example, from historical information obtained from the airline operator customer based on the type of operations conducted by the customer. For example, the types of disruptions and severities will vary depending on whether the customer operates on a hub and spoke model in which flights tend to be relatively short, or a long haul, cross-country model with very few hubs. The disruption statistics include both the probability of a disruption occurring on a particular flight leg for a particular operator type, and a severity component which relates to the severity of the disruption. Thus, as shown at 44, the frequency distribution representing disruption probability for a given operator type is selected and applied for each flight leg. Similarly, as shown at 46, a frequency distribution representing delay severity probability, by operator type is selected and applied to each of the flight legs.

As a result of the steps discussed above, a disrupted flight schedule database 48 is obtained at 48. The disrupted flight schedule database 48 thus comprises a selected flight schedule in which the customer's aircraft have been assigned to each flight leg, wherein departure and/or arrival times are disrupted, i.e. delayed based on an assume probability of disruption and an assumed probability of severity. It should be noted here that the disrupted flight schedule reflects only initial disruptions that are predicted based on the assumed statistical disruption data, and do not reflect propagated delays, i.e. those additional downstream delays caused by the initial delays.

Figure 19:
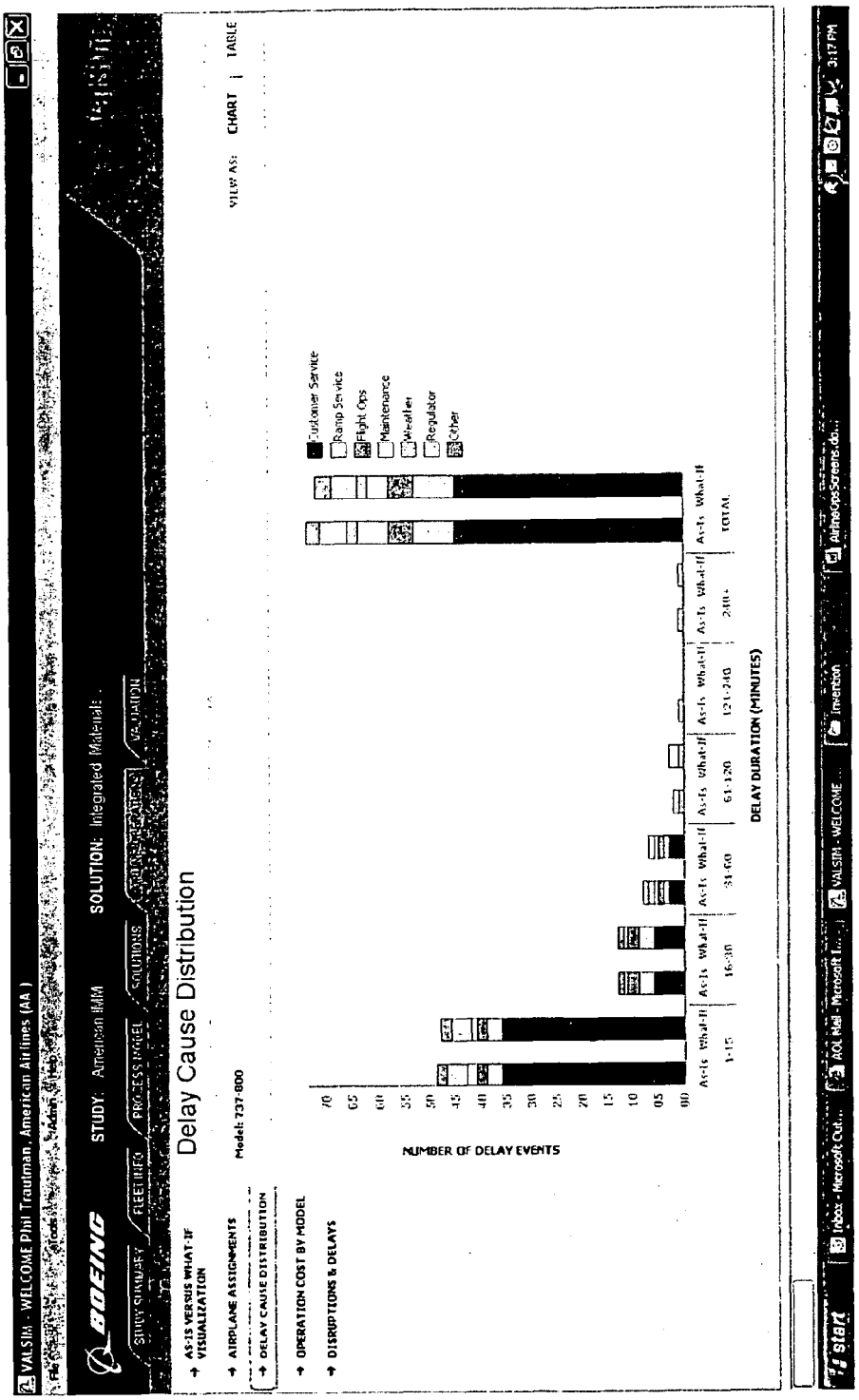
FIG. 19 is a view of a computer monitor screen capture showing disruption statistics in bar graph format.

The disrupted flight schedule developed at 48 is used in the simulation operations 30 to allow visualization of flight schedules, with simulation of flights across a geographic map, in sufficient detail to show airport layout, runway, taxiway and gate usage. This simulation allows the customer to visually experience, on an interactive basis, airport congestion caused by flight delays, including the initial delays and sub sequential down line delays. The simulation operations 30 allow a visual comparison between the "as is" and "what if" cases which provides the customer with a visual demonstration of the impact of products and services intended to reduce or eliminate the adverse effects of disruption events. As shown at 50, two sets of disruption statistics are displayed, typically in side-by-side relationship in the form of bar graphs. These two sets of statistics show flight delays and cancellations based on the disrupted flight schedule without use of the product or service being marketed, and a similar set of delay/cancellation statistics based on the "what if" use of the product or services. FIG. 19 shows a typical computer monitor screen capture of what the user views when the two sets of disruption statistics are displayed in side-by-side bar graphs. In FIG. 19, the number of delay events for the "as is" and "what if" cases are displayed as a function of their severity, which in this case, is represented by delay duration in minutes.

Figure 20:
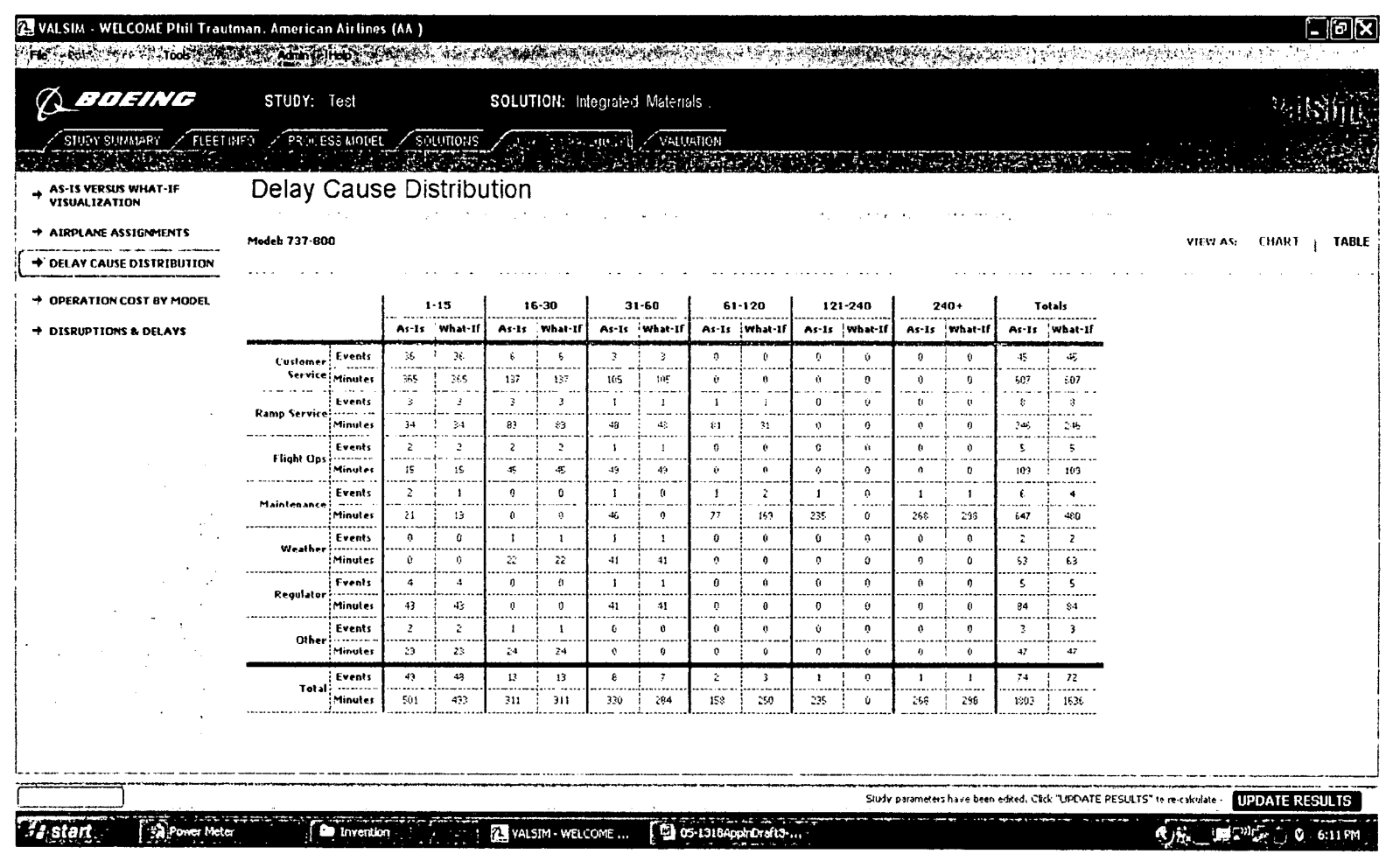

If desired, as shown at 52, graphical information can be displayed in a matrix format. For example, a matrix can be displayed representing the aircraft assignments from the flight schedule, consisting of a matrix of information showing the specific aircraft and their delays by flight leg. FIG. 20 shows a typical computer monitor screen capture of another matrix showing the distribution of flight delays as a function of their cause, for the "as is" and "what if" cases.

Next, as shown at 54, information is generated representing delay propagation. This delay propagation represents the additional cost impact on the flight schedule of the delays introduced into the disrupted flight schedule at 48. A disrupted flight schedule with propagated delays is output and used at the next step 56 which involves generating data for the "as is" and "what if" scenarios. In order to generate this cost data, it is necessary, as shown in step 56 to generate a cost revenue schedule, wherein dollar costs are assigned to each type of disruption. For example a flight cancellation will have an assigned fixed cost, whereas disruptions due to maintenance would be assigned a cost per minute. Thus, a schedule of costs over time for each type of initial delay or cancellation is developed and is then used to generate the cost data at 56. The result of step 56 is a numerical display of cost data covering both the initial and propagated displays. If desired, this data may be converted into other outputs, such as chart forms at step 60.

In addition to providing the customer with visual displays of the "as is" and "what if" data as described above, the customer is also provided with a minute-by-minute visual simulation of flight operations for both the "as is" and "what if" cases using the disrupted flight schedule with all delay propagations. The simulated display indicated at step 62 is a minute-by-minute moving display in 3-D. This simulation process can be carried out using commercially available simulation software such as a Total Airspace and Airport Modeler (TAAM) available from Preston Aviation Solutions, a wholly own subsidiary of the Boeing Company. The TAAM is a fast time, gate-to-gate simulator of airport and airspace operations that presents realistic 4-D models of airspace and airports to facilitate decision, support, planning and analysis. TAAM can seamlessly model an entire airside and airspace environment, taking into consideration, gates, terminals, push back, taxiways, runways, terminal airspace, en-route and oceanic airspace. TAAM can also take into consideration weather conditions aircraft separation standards conflict detections, airline operation types and a variety of specific airport information.

Figure 21:
FIG. 21 is a computer monitor screen capture of a simulation of a flight schedule into an airport, wherein the delayed flights are highlighted.
Figure 22:
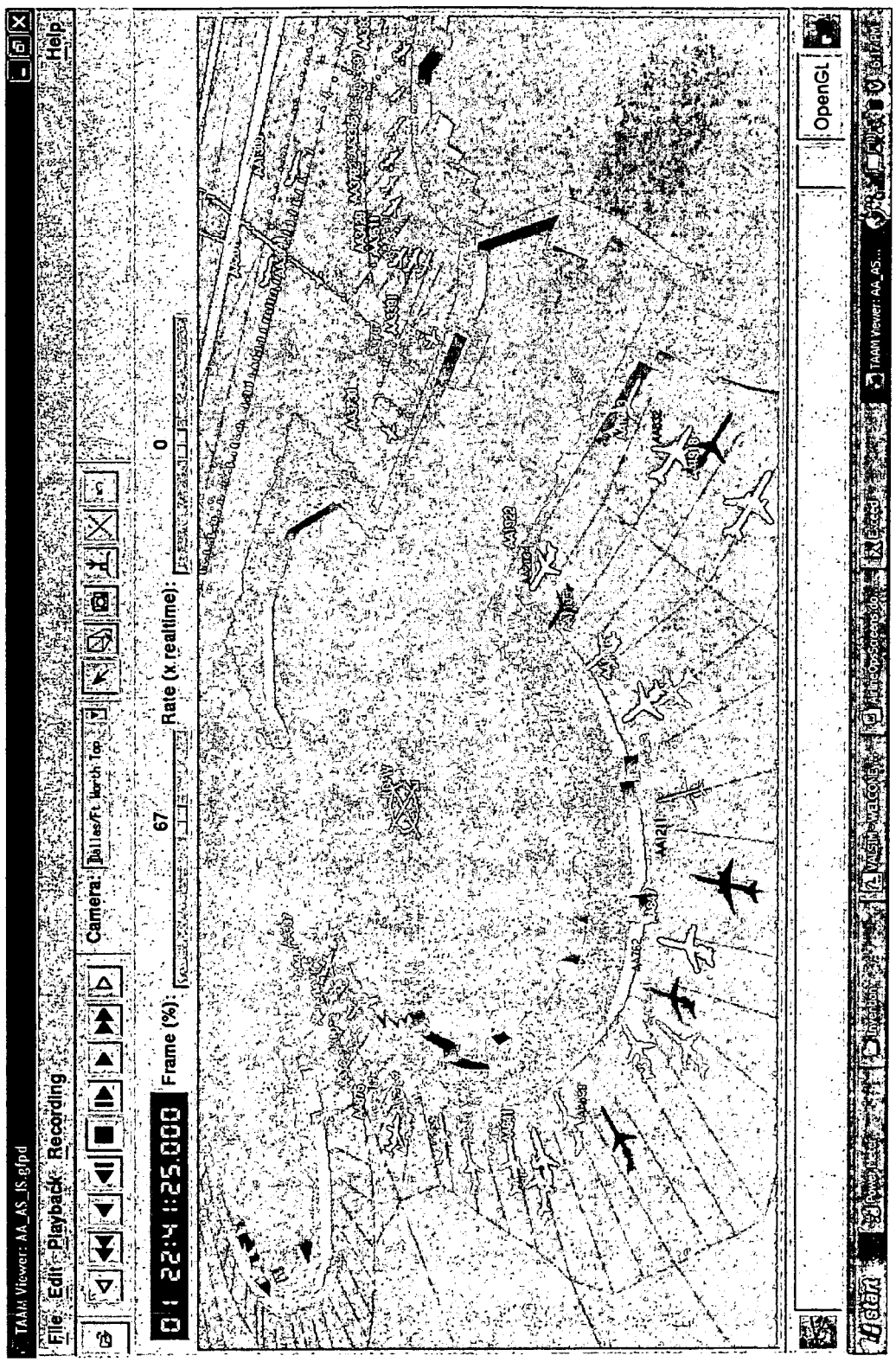
FIG. 22 is a view similar to FIG. 21, but showing the propagated effects of the delayed flights on later flights.

The "as is" and "what if" visual simulations provided at 62 can be logged and recorded for later playback at 64. The result of the simulation process at 64 is a screen display shown at 32 in which 3-D flight operations may be viewed by the customer for both the "as is" and "what if" cases. For example, FIG. 21 shows a typical computer monitor screen capture of a simulation of a flight schedule into the airport at Dallas/Fort Worth Tex. Late flights are highlighted or shown in a specific color, and the delay propagation to later flights is then measured and displayed. The effects of this initial flight delay can be shown in a number of ways. For example, FIG. 22 is a computer monitor screen capture of a simulation showing aircraft at gates in the Dallas/Fort Worth airport, wherein aircraft that have been delayed as a result of the initial delay shown in FIG. 21 are also highlighted or designated by a particular color. Simultaneously, or alternatively, graphical information can be displayed at 34 consisting, for example, of a GANTT chart that provides the viewer with an alternate view of the modified flight schedule.

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and no embodiment need necessarily exhibit such advantages to fall within the scope of the invention. Accordingly, the invention is not limited, except as by the appended claims.

What is claimed is:

1. A computer implemented method of visualizing commercial airline flight operations based on aircraft flight schedules in response to a proposed new product or service, comprising the steps of:
   (A) selecting a computer implemented airline flight schedule representing scheduled aircraft flights, said selecting by a computer user employing a computer to execute programmed instructions stored in a computer readable medium;
   (B) introducing by computer simulation at least one initial flight disruption into the flight schedule selected in step (A), said at least one disruption comprising an event, said event selected by said computer user within said computer simulation, said computer simulation comprising employing a computer to execute programmed instructions stored in a computer readable medium;
   (C) generating by said computer simulation airline operations information caused by the disruption introduced in step (B), and simulating by said computer simulation airline operations information caused by computer simulated corrective action taken in response to the disruption, said computer simulated corrective action comprising the simulated use of said proposed new product or service, said product or service selected by said computer user within said computer simulation, said product or service comprising computer software or databases being demonstrated and marketed to said airline, said new product or service reducing the adverse impact of said initial flight disruption on simulated airline flight operations;
   (D) visually simulating by said computer simulation airline operations using the disruption causing information generated in step (C); and,
   (E) visually simulating by said computer simulation airline operations using the corrective action causing information generated in step (C).

2. The method of claim 1, including the step of introducing into the flight schedule selected in step (A), at least one additional disruption caused by the initial disruption, and wherein the airline operations visually simulated in steps (D) and (E) each reflect the additional disruption.

3. The method of claim 1, wherein step (B) includes:
producing for each flight leg in the selected flight schedule statistical data representing a frequency distribution of disruptions, and a frequency distribution of flight disruption severity.

4. The method of claim 3, including the step of generating a disrupted airline flight schedule using the flight schedule selected in step (A), and the statistical data produced for each flight leg.

5. The method of claim 1, including the step of graphically displaying, in juxtaposed relationship, the disruption causing airline operations information and the corrective action causing airline operations information generated in step (C).

6. The method of claim 3, including the step of graphically displaying a matrix showing the delay of each aircraft flight for each flight leg in the selected flight schedule.

7. The method of claim 1, including the steps of:
(F) introducing additional disruptions into the selected flight schedule that represent a propagation of the initial disruption; and,
(G) determining the additional cost incurred in the airline operations resulting from the initial and additional disruptions.

8. The method of claim 1, including the steps of:
(F) calculating airline operating costs using the disruption causing airline operations information; and,
(G) calculating airline operating costs using the corrective action causing airline operations information.

9. A computer implemented method of visualizing the effect of a proposed new product or service on commercial airline flight operations having disrupted aircraft flight schedules, comprising the steps of:
(A) selecting a computer implemented airline flight schedule having scheduled flights for a plurality of aircraft, said selecting by a computer user employing a computer to execute programmed instructions stored in a computer readable medium;
(B) introducing by computer simulation an initial flight disruption into the flight schedule selected in step (A)), said initial flight disruption comprising an event, said event selected by said computer user within said computer simulation, said computer simulation comprising employing a computer to execute programmed instructions stored in a computer readable medium;
(C) generating by said computer simulation a first set of airline operations data representing the effect on airline flight operations of the initial flight disruption introduced in step (B);
(D) proposing by said computer simulation an operations solution selected by said computer user within said computer simulation, said operations solution comprising the simulated use of said proposed new product or service selected by said computer user, said new product or service comprising computer software or databases being demonstrated and marketed to said airline, said new product or service reducing the adverse impact of said initial flight disruption on simulated airline flight operations;
(E) generating by said computer simulation a second set of airline operations data representing the effect on airline flight operations of the use of the solution proposed in step (D); and,
(F) displaying by said computer simulation a graphical comparison of the first and second sets of data respectively generated in steps (C) and (E).

10. The method of claim 9, including the step of generating a visual simulation of airline operations using at least one of the first and second sets of airline operations data.

11. The method of claim 9, including the step of determining propagated disruptions in the selected flight schedule caused by the initial disruption, and wherein the graphical comparison displayed in step (F) reflects the propagated disruptions.

12. The method of claim 10, including the step of determining propagated disruptions in the selected flight schedule caused by the initial disruption, and wherein the visual simulation reflects the propagated disruptions.

13. The method of claim 9 wherein step (B) includes producing for each flight leg in the selected flight schedule, statistical data representing a frequency distribution of disruptions, and a frequency distribution of flight disruption severity.

14. The method of claim 13, including the step of generating a disrupted airline flight schedule using the flight schedule selected in step (A), and the statistical data produced for each flight leg.

15. The method of claim 13, including the step of graphically displaying a matrix showing the delay of each aircraft flight for each flight leg in the selected flight schedule.

16. The method of claim 9, including the steps of:
(G) introducing additional disruptions into the selected flight schedule that represent a propagation of the initial disruption; and,
(H) determining the additional cost incurred in the airline operations resulting from the initial and additional disruptions.

17. A computer implemented method of graphically simulating the effect of a program implemented in airline flight operations to reduce the effect of disruptions in scheduled airline flights, comprising the steps of:
(A) selecting a computer implemented airline flight schedule representing scheduled aircraft flights, said selection by a computer user employing a computer to execute programmed instructions stored in a computer readable medium;
(B) introducing by computer simulation at least one initial flight disruption into the flight schedule selected in step (A), at least one initial flight disruption comprising an event, said event selected by said computer user within said computer simulation, said computer simulation comprising employing a computer to execute programmed instructions stored in a computer readable medium;
(C) visually simulating by said computer simulation airline flight operations based on a disrupted flight schedule produced by the initial flight disruption in step (B), said disrupted flight schedule including propagated disruptions in the selected flight schedule caused by the initial flight disruption;
(D) selecting within said computer simulation by said computer user a program for reducing the effect of the disruption on flight operations, said program comprising the simulated use of a proposed new product or service selected by said computer user, said proposed new product or service comprising computer software or databases being demonstrated and marketed to said airline, said new product or service reducing the adverse impact of said initial flight disruption on simulated airline flight operations; and,
(E) visually simulating by said computer simulation airline flight operations reflecting implementation of the program selected in step (D).

18. The method of claim 17, wherein step (B) includes producing for each flight leg in the selected flight schedule, statistical data representing a frequency distribution of disruptions, and a frequency distribution of flight disruption severity.

19. The method of claim 17, including the step of graphically displaying a matrix showing the delay of each aircraft flight for each flight leg in the selected flight schedule.

20. The method of claim 17, including the step of graphically displaying, in juxtaposed relationship, data representing airline flight operations based on the disrupted flight schedule, and data representing airline flight operations reflecting the use of the program selected in step (D).

21. The method of claim 17, including the steps of:
(F) calculating the cost of airline flight operations based on the disrupted flight schedule; and,
(G) calculating the cost of airline flight operations based on use of the program selected in step (D).

22. The method of claim 17, including the steps of:
(F) calculating the time length of flight delays resulting from the disruptions in the selected flight schedule; and,
(G) calculating the time length of flight delays resulting from the disruptions based on use of the program selected in step (D).

* * * * *